United States Patent [19]

Jürgens et al.

[11] Patent Number: 5,063,510

[45] Date of Patent: Nov. 5, 1991

[54] PROCESS FOR THE ADAPTIVE CONTROL OF AN INTERNAL-COMBUSTION ENGINE AND/OR ANOTHER DRIVE COMPONENT OF A MOTOR VEHICLE

[75] Inventors: Gunter Jürgens, Waiblingen; Udo Sürig, Stuttgart; Lothar Lang, Esslingen, all of Fed. Rep. of Germany

[73] Assignee: Daimler-Benz AG, Fed. Rep. of Germany

[21] Appl. No.: 387,530

[22] Filed: Jul. 31, 1989

[30] Foreign Application Priority Data

Jul. 29, 1988 [DE] Fed. Rep. of Germany ....... 3825749

[51] Int. Cl.⁵ .......................................... B60K 41/08
[52] U.S. Cl. ........................... 364/424.1; 364/431.04; 364/431.08; 364/431.06
[58] Field of Search ........... 364/424.1, 431.04, 431.05, 364/431.07, 431.08, 431.06; 74/866, 867; 123/489, 571

[56] References Cited

U.S. PATENT DOCUMENTS

| | | | |
|---|---|---|---|
| 4,372,119 | 2/1983 | Gillbrand | 60/600 |
| 4,454,853 | 6/1984 | Hasegawa | 364/431.04 |
| 4,648,040 | 3/1987 | Cornell et al. | 364/424.1 |
| 4,689,746 | 8/1987 | Braun et al. | 364/431.05 |
| 4,733,358 | 3/1988 | Abthoff et al. | 364/431.05 |
| 4,742,461 | 5/1988 | Eschrich et al. | 364/424.1 |
| 4,763,265 | 8/1988 | Kawanabe et al. | 364/431.04 |
| 4,829,440 | 5/1989 | Abe | 364/431.06 |
| 4,843,556 | 6/1989 | Wakeman et al. | 364/431.08 |
| 4,901,240 | 2/1990 | Schmidt et al. | 364/431.06 |
| 4,905,545 | 3/1990 | Leising et al. | 74/877 |

FOREIGN PATENT DOCUMENTS

| | | |
|---|---|---|
| 3703496 | 8/1987 | Fed. Rep. of Germany . |
| 3116593 | 10/1990 | Fed. Rep. of Germany . |
| 2186997 | 1/1987 | United Kingdom . |

*Primary Examiner*—Salvatore Cangialosi
*Attorney, Agent, or Firm*—Evenson, Wands, Edwards, Lenahan & McKeown

[57] ABSTRACT

In a process for adaptive control of an internal-combustion engine or of another drive component of a motor vehicle, a set value/actual value comparison of a critical time interval with regard to an optimum operating behaviour is triggered upon each non-steady operating state. Set values and correction values for influencing a casual controlled variable with regard to the operating behaviour are assigned to selected operating points of the internal-combustion engine in the form of stored characteristic maps. If appropriate, the correction values are replaced by new correction values, determined according to a deviation. If the non-steady operating state occurs at a non-selected operating point, intermediate values for set value and correction value are interpolated. The interpolated correction intermediate value is used for influencing the controlled variable during the instantaneous non-steady operating state and, in the event of a deviation, for determining a new correction value, which is transferred exclusively into a neighboring selected operating point of the characteristic map.

22 Claims, 13 Drawing Sheets

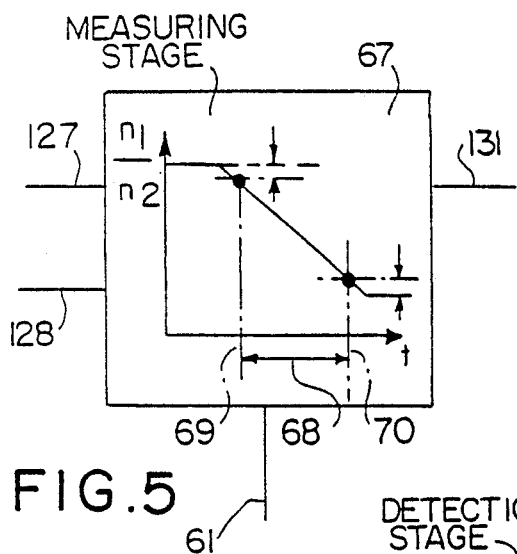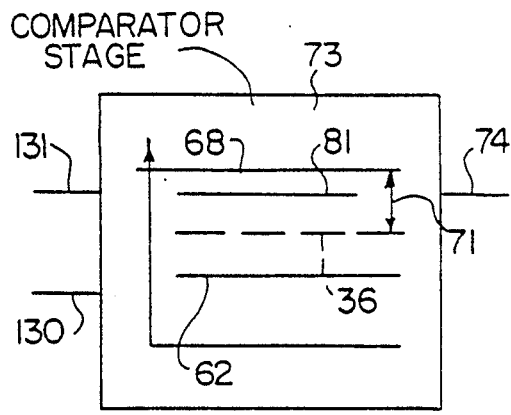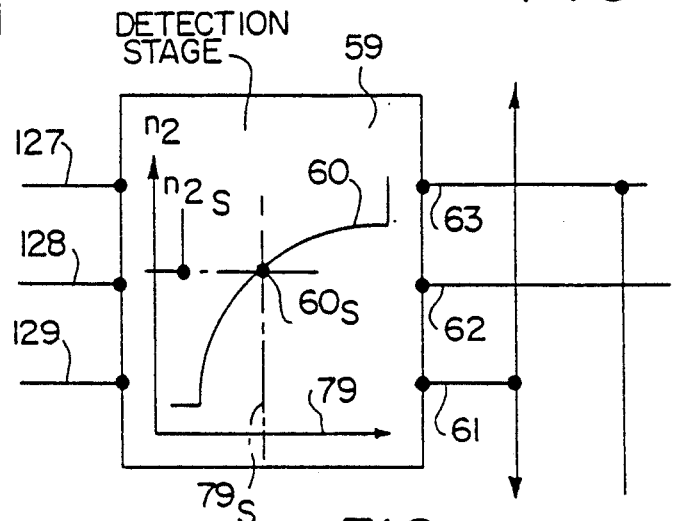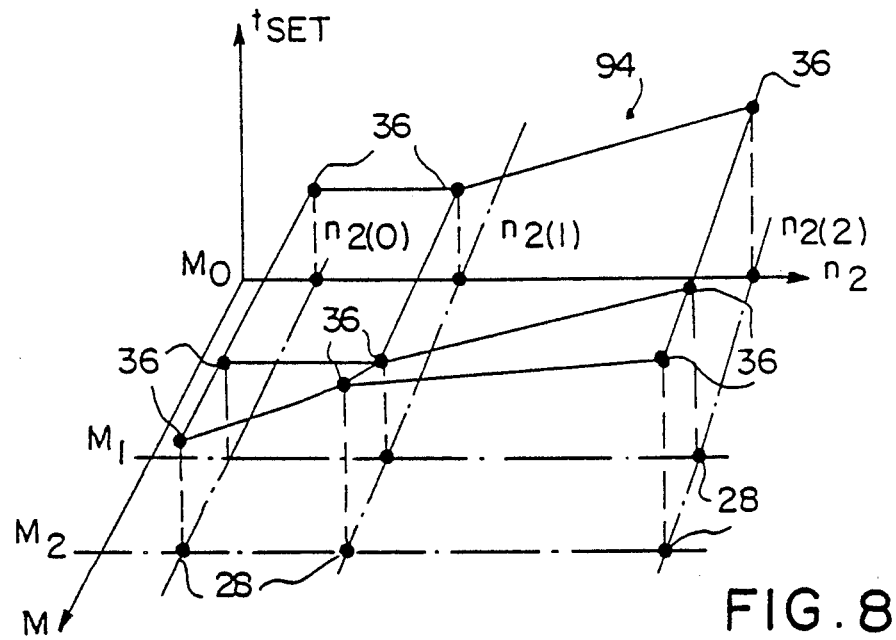

PROCESS FOR THE ADAPTIVE CONTROL OF AN INTERNAL-COMBUSTION ENGINE AND/OR ANOTHER DRIVE COMPONENT OF A MOTOR VEHICLE

BACKGROUND AND SUMMARY OF THE INVENTION

The present invention generally relates to a process and arrangement for the adaptive control of a controlled element such as, for example, an internal combustion engine and/or a drive component of a motor vehicle, and more particularly, to such a process and arrangement wherein a characteristic map, storing correction values for selected operating points of the controlled component, is quickly adapted in response to the operation of the controlled component.

German Published Unexamined Patent Application No. 3,436,190 discloses the adaptive control of an automatically shifting speed-change gear as a drive component of a motor vehicle. In this arrangement, a shift time of a gear shift associated with a change in the gear transmission is regarded as a non-steady operating state and is used as a critical time interval for a set value/actual value comparison. The working pressure or shifting pressure, which is used for impingement of shift final control elements actuating friction elements (clutches, brakes) involved in the shift, is considered as one of the decisive factors for determining the duration of the shift time. This shifting pressure is influenced by correction values according to deviations which occur between the set value and actual value of the shift. In the case of this process, the actual value for the shifting pressure is obtained by averaging measured values from a multiplicity of shifts. Since shifts, in most cases, rarely occur at the same operating points, the period of time up to the final adaption of the characteristic map or graph or diagram stored in a memory for determining the correction values is relatively great.

For the same reasons, this disadvantage is shared in a further process disclosed by German Patent Specification No. 3,424,532 for the control of a driving engine having a controlled exhaust catalytic converter, in which a λ probe is positioned both ahead of and behind an air exhaust catalytic converter for optimization c of an air-fuel ratio (λ) in a non-steady state and for detecting the existence of an undesired air-fuel ratio. The detected, undesired air-fuel ratio is correspondingly corrected by means of the λ probe arranged ahead of the exhaust catalytic converter. In the case of this process, correction values for the λ control and the time interval after which the λ probe down stream from the exhaust catalytic converter again indicates a correct air-fuel ratio are only stored for certain, predetermined engine operating states in the non-steady range. Only upon renewed existence of the same engine operating state is recourse made to the stored correction values, the correction values being varied in the direction of the correct λ value. The time interval then obtained is compared with the stored time interval, a time reduction leading to storage of the new correction values and of the new time interval. By repetition of these operations, but only upon recurrence of the same engine operating state, the correction values are iteratively corrected until the time interval reaches a minimum. Here too, the period of time until reaching the minimum value of the critical time interval is thus relatively great.

In the case of a process of a different generic type without adaptive correction intervention for the control of abnormal combustion, i.e. knocking, of an internal-combustion engine as disclosed by German Patent Specification No. 3,049,980, a special measured variable converter is used, which is able to register a parameter dependent on the combustion, for example the pressure and/or temperature conditions prevailing in the internal-combustion engine, and to generate an output signal corresponding to such a parameter value, in order to act on at least one mechanism controlling the combustion in the internal-combustion engine. In the case of this process, the output signal of the measured variable converter is compared with a reference signal, which has a signal value proportional to the engine speed and represents a parameter value with optimal combustion in the internal-combustion engine. According to the deviation between the measured and optimal signal, a deviation signal is generated, which influences the intake pressure of the internal-combustion engine in such a way that the intake pressure is reduced whenever the parameter value registered by the measured variable converter represents conditions with abnormally high pressure and/or abnormally high temperature during the combustion in the internal-combustion engine.

Accordingly, an object of the present invention is to provide an improved process and arrangement for adaptive control of an internal-combustion engine and/or another drive component of a motor vehicle in such a way that a faster ultimate adaptation of a characteristic map or diagram for indicating correction values for selected predetermined engine operating points is achieved, i.e. a respective change in correction values quickly moves to zero after a small number of non-steady operating states.

In the case of the process according to preferred embodiments of the present invention, if appropriate, a correction of the characteristic map takes place after each non-steady operating state irrespective of whether the latter occurred at a selected operating point or at a non-selected operating point, so that the critical period of time is reduced to a small amount, namely to an occurrence of relatively few non-steady operating states.

In the case of the process according to preferred embodiments of the present invention, a type of local flexible network effect in adaptation of the characteristic map is achieved both by entry of a new correction value and by entry of a new transferred correction value, in each case, at the point of a selected operating point of the internal-combustion engine because the new correction value in each case also forms the basis for determining set value and correction value for non-steady operating states occurring at a neighboring vicinity of the associated selected operating point. This has an effect of reducing the number of non-steady operating states necessary for the ultimate adaptation of the characteristic map for the correction values.

One particular advantage of the present invention is that the accuracy, with regard to the correction value formation, is increased in particular.

In the case of the process according to one embodiment of the invention, a damping in the adaptation step of the respectively following non-steady operating state is achieved in an advantageous way.

The process according to the invention can be adapted individually in an advantageous way, in each case, to one or more phases of the respective non-steady operating state, in which there occur, to varying degrees, fluctuations from operating parameters which can have an effect on the time interval.

An advantageous arrangement for carrying out the process according to the invention is also proposed, in which in one embodiment the technical outlay can be kept particularly small, above all with regard to the electronic memory capacities.

In the case of the proposed arrangement for carrying out the process according to the invention, the configuration of the control for a non-steady operating state occurring at a non-selected operating point can be implemented in an advantageous way for the case where the set value/actual value comparison does not produce inadmissible deviations so that a correction of the characteristic map concerned is not to be performed.

In further development of the proposed arrangement for carrying out the process according to the invention, the configuration for control for a non-steady operating state occurring at a non-selected operating point can be provided in an advantageous way for the case where the set value/actual value comparison produces deviations exceeding an admissible extent, so that the characteristic map concerned is corrected.

In the case of the proposed arrangement for carrying out the process according to the invention, the configuration for control for a non-steady operating state occurring at a selected operating point can be implemented in an advantageous way, this configuration also making corrections of the characteristic map concerned possible, if appropriate.

The proposed arrangement for carrying out the process according to the invention can be used universally, i.e. independently of whether the control of the internal-combustion engine or of another drive component of the motor vehicle is concerned.

In the case of the proposed arrangement for carrying out the process according to the invention, a configuration has proved advantageous if the control of the speed-change gear as drive component of the motor vehicle is concerned.

Thus, in the case of the proposed arrangement for carrying out the process according to the invention, the change in the travelling speed is taken into account in a shift producing a non-steady operating state with regard to the gear transmission and a precise operating point in the part-load range is determined for the shift, which is not readily possible by a measurement of the engine speed with a hydrodynamic starting converter connected ahead of the speed-change gear in the flux of force.

It is also possible, in an advantageous way in the case of the proposed arrangement for carrying out the process according to the invention, to take into account friction value fluctuations occurring to varying degrees during a shift.

In the case of the proposed arrangement for carrying out the process according to the invention, an indirect determination of the gearbox input speed is particularly advantageous in those cases in which a hydrodynamic torque converter is connected ahead of the speed-change gear in the flux of force. This is so since the accessibility of the turbine wheel or of the turbine wheel shaft, often forming the gearbox input shaft itself, or the arrangement of speed sensors in this gearbox area may be hampered, for example because the three blade wheels work in a closed converter housing.

In the case of a proposed arrangement for carrying out the process according to the invention, an embodiment of the invention has proved advantageous in application to the known control of an internal-combustion engine with an exhaust catalytic converter and with a λ probe positioned both ahead of and after the exhaust catalytic converter.

In the case of a proposed arrangement for carrying out the process according to the invention, an embodiment of the invention proved advantageous in application to the known control of an internal-combustion engine to avoid abnormal combustion, so-called knocking.

Other objects, advantages and novel features of the present invention will become apparent from the following detailed description of the invention when considered in conjunction with the accompanying drawings.

BRIEF DESCRIPTION OF THE DRAWINGS

FIGS. 5 to 7 show more detailed representations of three functional stages of the block circuit diagram of FIG. 1;

FIG. 8 shows a perspective representation of a characteristic map of set values in the case of a memory in the block circuit diagram of FIG. 1;

DETAILED DESCRIPTION OF THE DRAWINGS

With reference to FIGS. 1 to 15 embodiments of a process and arrangement according to preferred embodiments of the invention are described for the control of a speed-change gear.

Figure 1:
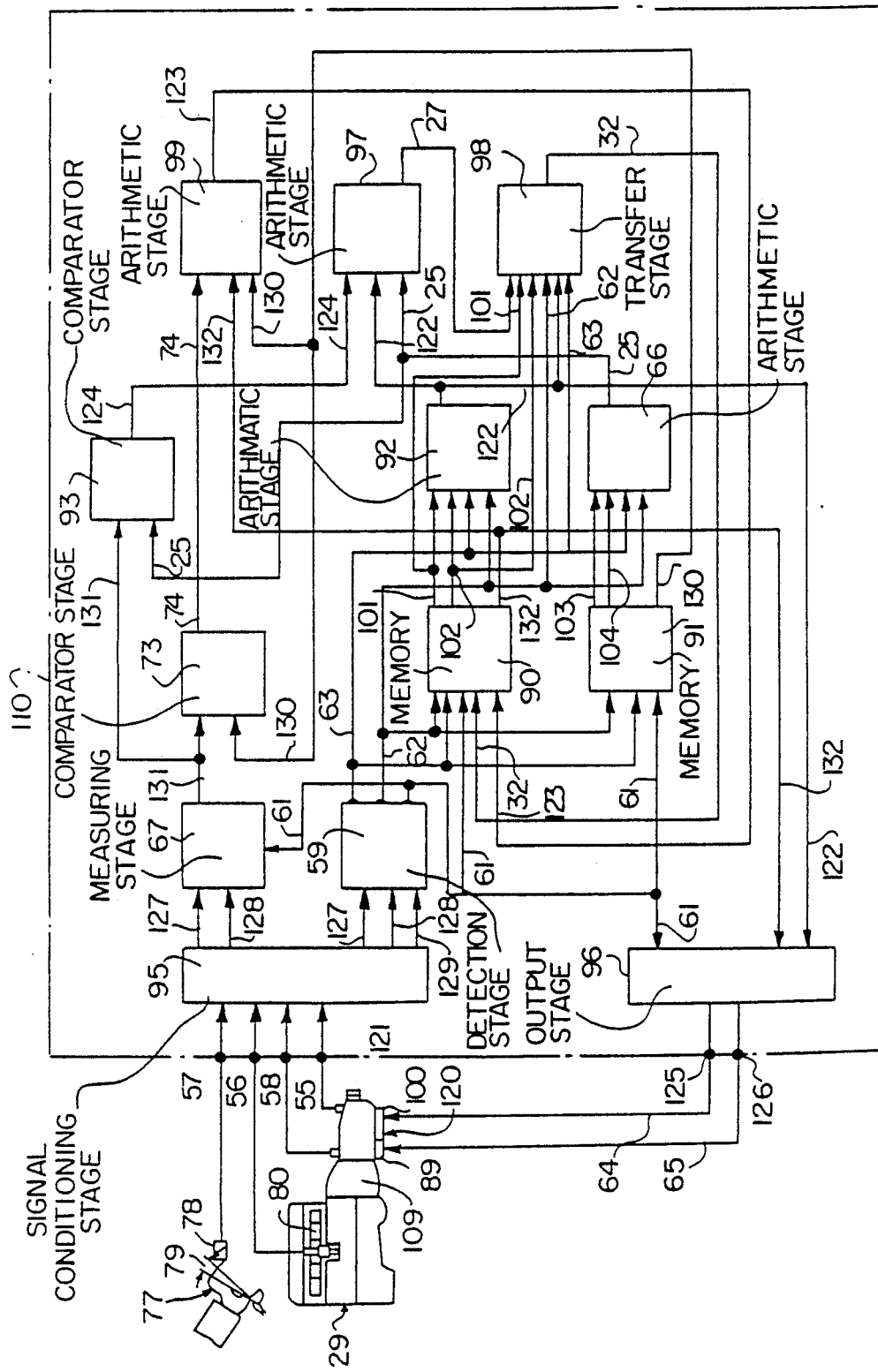
FIG. 1 shows the representation of a process and an arrangement according to the invention in a first embodiment for the control of a speed-change gear with an automatic shift mechanism by a block circuit diagram.
Figure 15:
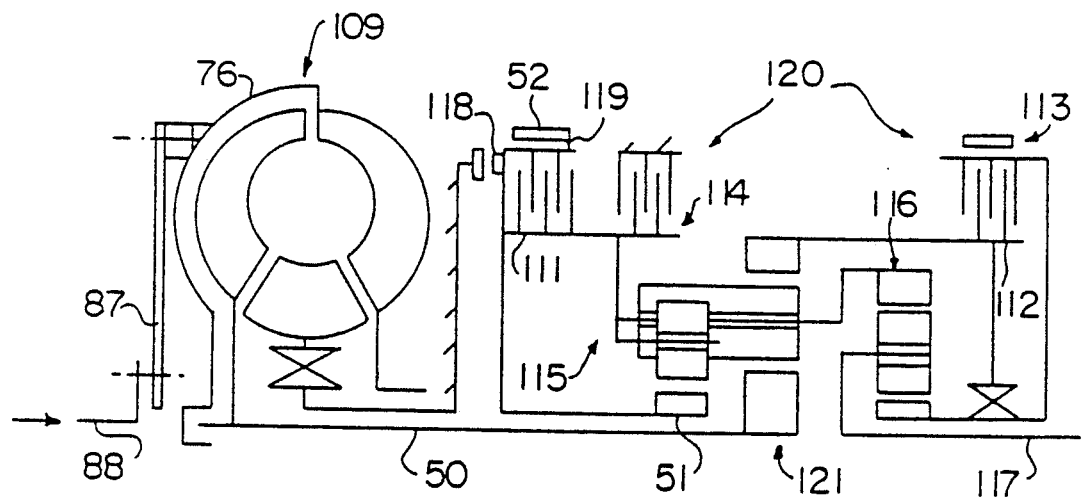
FIG. 15 shows a variant of the control according to the invention of the speed-change gear according to FIGS. 1 to 14 as a sixth embodiment.

As shown in FIG. 1, a motor vehicle is driven by a drive unit, which as an internal-combustion engine 29 and a planet wheel speed-change gear 121 connected to the output of engine 29 via a hydrodynamic torque converter 109. An automatic shift mechanism 120 of the speed-change gear 121, controlled by an electronic control unit 110, works with friction elements, i.e. gear speed clutches 111 and 112 of the multi-plate type, gear speed brakes 52 and 113 with brake band actuation and a gear speed brake 114 of the multi-plate type as shown in FIG. 15.

The speed-change gear 121 has a Ravigneaux gear 115 connected to friction elements 52, 111, 112 and 114 as well as to a gearbox input shaft 50. A single-carrier planet wheel set 116, can be driven by the Ravigneaux gear 115 and is connected to the friction elements 112, 113 as well as to a gearbox output shaft 117, which drives at least one vehicle axle via a corresponding axle drive in a usual way.

While an analog signal for an input 55 of the control unit 110 is generally already available for rotational speed $n_2$ of the gearbox output shaft 117 via an usual tachometer drive shaft or indicator, a direct registration of a rotation speed $n_1$ of the gearbox input shaft 50 is often difficult to access. If, as indicated in FIG. 15, a speed signal transmitter 118, connected to a further input 58 of the control unit 110, cannot be arranged fixedly in terms of rotation directly with respect to the gearbox input shaft 50, an arrangement on a radially outer lying brake drum 119 of the gear speed brake 52 is often simpler.

The gearbox input shaft 50, connected at an inner shaft end thereof to a gear element of the Ravigneaux gear 115, passes through a further gear element 51 of the gear 115 with a hollow shaft connecting the brake drum 119 and an adjoining stator shaft, which is fixed to the housing, in order to then protrude with a front shaft end thereof into converter housing 76 of torque converter 109, which is connected via a drive disc 87 to a crankshaft 88 of the internal-combustion engine 29.

Otherwise it is in accordance with the state of the art as to how the speed-change gear 121 is specifically designed and how the four forward gears, provided in this case, are shifted, between which three shifts up and three shifts down, i.e. a total of six shifts, are possible. The friction elements are actuated in a known way by hydraulic shift final control elements, preferably, of an axial piston type, which are operated with a shifting or working pressure which can be influenced, inter alia, by a modulating signal taken from an output 126 of the control unit 110 and switched, via a line 65, to a pressure control valve 89, of the shift mechanism 120 provided for this.

The power control of the drive unit takes place from an accelerator pedal 77, which is connected via a potentiometer 78 to an input 57 of the control unit 110, so that there is an analog signal provided to the control unit 110 corresponding to a setting 79 of the accelerator pedal 77. A further input 56 of the control unit 110 is connected to a pressure signal transmitter of an air intake system 80 of the internal-combustion engine 29, in order to obtain a signal analogous to and representative of the engine load for input to the control unit 110.

The control unit 110 has signal conditioning stages 95, connected to its inputs 55 to 58, a further output 125 as well as output stages 96, connected to outputs 125 and 126. The output 125 is in connection with shift control valves 100 of the shift mechanism 120 via a line 64.

The control unit 110 is, furthermore, designed in principle to operate as discussed in the following. The signal conditioning stage 95 have output lines 127 and 128 for providing signals representative of gearbox input and output speeds $n_1$ and $n_2$, respectively, both to a measuring stage 67 for determining an actual value 68 of the shifting time by registering the change in the gear transmission $n_1/n_2$, and, with an additional output line 129, for providing signals representative of a load of the internal-combustion engine 29, to a detection stage 59 for determining the gear speed to be selected and the associated operating point of the internal combustion engine 29.

The control unit 110 has a memory arrangement 90, 91, which contains memory locations, for example in the form of a separate memory 90, in which are entered characteristic maps 30 for assignment of correction values 26 to selected operating points 28 of the internal-combustion engine 29. The memory arrangement 90, 91 also contains memory locations, for example in the form of a separate memory 91, in which are entered characteristic maps 94 for assignment of set values 36 for the shifting time for selected operating points 28.

The detection stage 59 is connected by a line 61 for providing a shift signal specifying a gear speed to be selected and provided to the output 125 of the control unit 110 via one of the output stages 96. If appropriate, the detection stage 59 is connected to the measuring stage 67 (for initiating the measuring operation) by line 61 and by two further lines 62,63 and line 61 to the memory 90 as well as to the memory 91. Line 62 is used for the transmission of a signal representative of information concerning the gearbox output speed $n_2$, associated with the respective operating point, and line 63 is used for the transmission of a signal representative of information on the load of the internal-combustion engine 29 associated with the operating point.

An output of the memory 91 is connected by a line 130 for transmitting a signal, representative of a set value 36 of a selected operating point 28, to an input of a comparator stage 73, the other input of which is connected to an output of the measuring stage 67 via a line 131. An output of the memory 90 is connected by a line 132 for the transmission of a signal representative of information concerning a respective correction value 26 associated with a selected operating point 28 to be provided to output 126 of the control unit 110 via one of the end stages 96.

As FIG. 5 shows, in the measuring stage 67, the actual value 68 of the shifting time is determined by the registration of the change in the gear transmission $n_1/n_2$, a starting point 69 and end point 70 thereof deviating from the actual shifting operation by an amount depending on the sensitivity of the measuring instrument. At the output of the measuring stage 67 there is then provided a signal corresponding to the actual value 68 of the shift time. According to FIG. 6, in the comparator stage 73, a comparison takes place between the actual value 68, inputted via the line 131, and a set value 36, associated with selected operating points 28, which is inputted via the line 130 from memory 91. Only in those cases in which the deviation 71 exceeds an upper threshold value 81 or a lower threshold value 82 is there a signal, representative of the actual value 68, present at the output of the comparator stage 73, which is connected to line 74.

As shown in FIG. 7, in the detection stage 59 there are stored, for each of the six possible shifts, a shift line 60 as geometrical location for shift points $60_S$, which are fixed in each case by a certain gearbox output speed $n_{2S}$, and a certain accelerator pedal position $79_S$. Consequently, if the gearbox output speed $n_2$ follows, according to FIG. 7, the shift line 60 upwards or downwards, at a certain constant accelerator pedal position $79_S$ (or a certain associated engine torque), a shift is triggered at the shift point $60_S$ concerned. In this case, at the output of the detection stage 59 connected to line 61 there is, as already indicated above, a signal representative of the gear speed to be selected. At the output connected to the line 62 there appears a signal representative of the gearbox output speed $n_{2S}$ of the shift point, while at the output connected to line 63 there is a signal representative of the accelerator pedal position or the engine torque $79_S$ of the shift point.

In the memory 91 there are stored for each of the six possible shifts, a characteristic map 94, one of which is shown diagrammatically in FIG. 8.

According to FIG. 8, nine operating points 28 of the internal-combustion engine 29 are selected, which are characterized by a certain torque $M_0$ and $M_1$ and $M_2$, and a respective gearbox output speed $n_{2(0)}$ and $n_{2(1)}$ and $n_{2(2)}$, which, in turn, correspond to a certain internal-combustion engine speed, which is taken into account by the assignment of the characteristic map 94 to the respective gear transmission and its addressing via the associated gear speed signal of the line 61. The nine selected operating points 28, which are moreover identical for all six characteristic maps 94 in their coordinates $M_x$ and $n_{2(x)}$, are each assigned a certain set value 36 for the shift time. Only four different amounts are provided for the nine set values 36 and their distribution is performed, for example, in such a way that the three operating points 28 with the coordinates $M_2/n_{2(1)}$ and $M_2/n_{2(2)}$ are the same as each other in terms of amount, but different from the other set values. The set values 36 of the other two operating points 28 with the coordinates $M_0/n_{2(2)}$ and $M_1/n_{2(2)}$ are different in terms of the amount both from each other and from the other set values 36.

Figure 9:
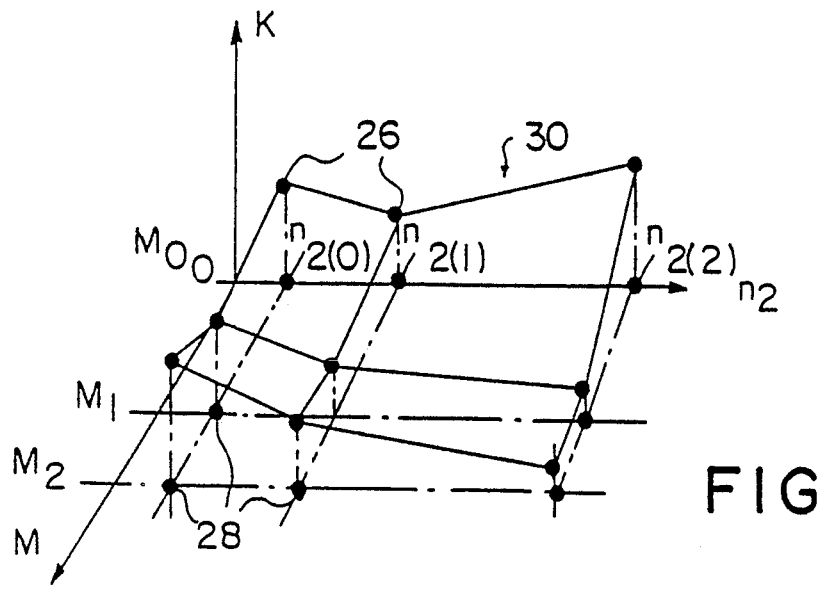
FIG. 9 shows a perspective representation of a characteristic map of correction values in the case of a further memory in the block circuit diagram of FIG. 1.

In the memory 90 there are stored, for each of the six possible shifts, a characteristic map 30, one of which is shown diagrammatically in FIG. 9. According FIG. 9, nine operating points 28 are selected, which are identical in their coordinates $M_x$ and $n_{2(x)}$ both for all characteristic maps 30 of the memory 90 and to the selected operating points 28 of the characteristic maps 94 of the memory 91. The characteristic maps 30 are also addressed, via the respective gear speed signal of the line 61, so that the gear speed transmission is taken into account.

The nine selected operating points 28 of a characteristic map 30 are each assigned a correction value 26, it being possible for all nine correction values to be different from one another in terms of the amount.

If the motor vehicle occupies a driving state in which a shift line 60, as seen in FIG. 7, is followed at one of the nine selected operating points 28, the detection stage 59 then activates, via line 61, the shift control valves 100 in the shift mechanism 120 provided for performing the shift as well as the respective associated characteristic maps 30 and 94 of the memory arrangement 90, 91 and, if appropriate, also the measuring stage 67, if the latter is not activated by the beginning of the change in the gear transmission $n_1/n_2$ itself.

On the basis of the coordinate values $n_{2(x)}$ and $M_x$, transferred via the line 62 and 63, the correction value 26 assigned to the selected operating point 28 concerned is determined in the characteristic map 30 of the memory 90 addressed by the gear speed signal of line 61 and a corresponding signal is switched through line 132 leaving the memory 90 to the control valve 89 via one of the interposed output stages 96.

On the basis of the coordinate values $n_{2(x)}$ and $M_x$, transferred via the lines 62 and 63, the set value assigned to the selected operating point 28 concerned is determined in the characteristic map 94 of the memory 91 likewise addressed by the gear speed signal of line 61 and switched via output line 130 to the comparator stage 73, into which the actual value 68 determined by the measuring stage 67 is inputted via the line 131 after completion of the shift. If the deviation 71 lies within the tolerance window predetermined by the threshold values 81 and 82, and adaption of the characteristic map 30 concerned is not carried out.

Figure 2:
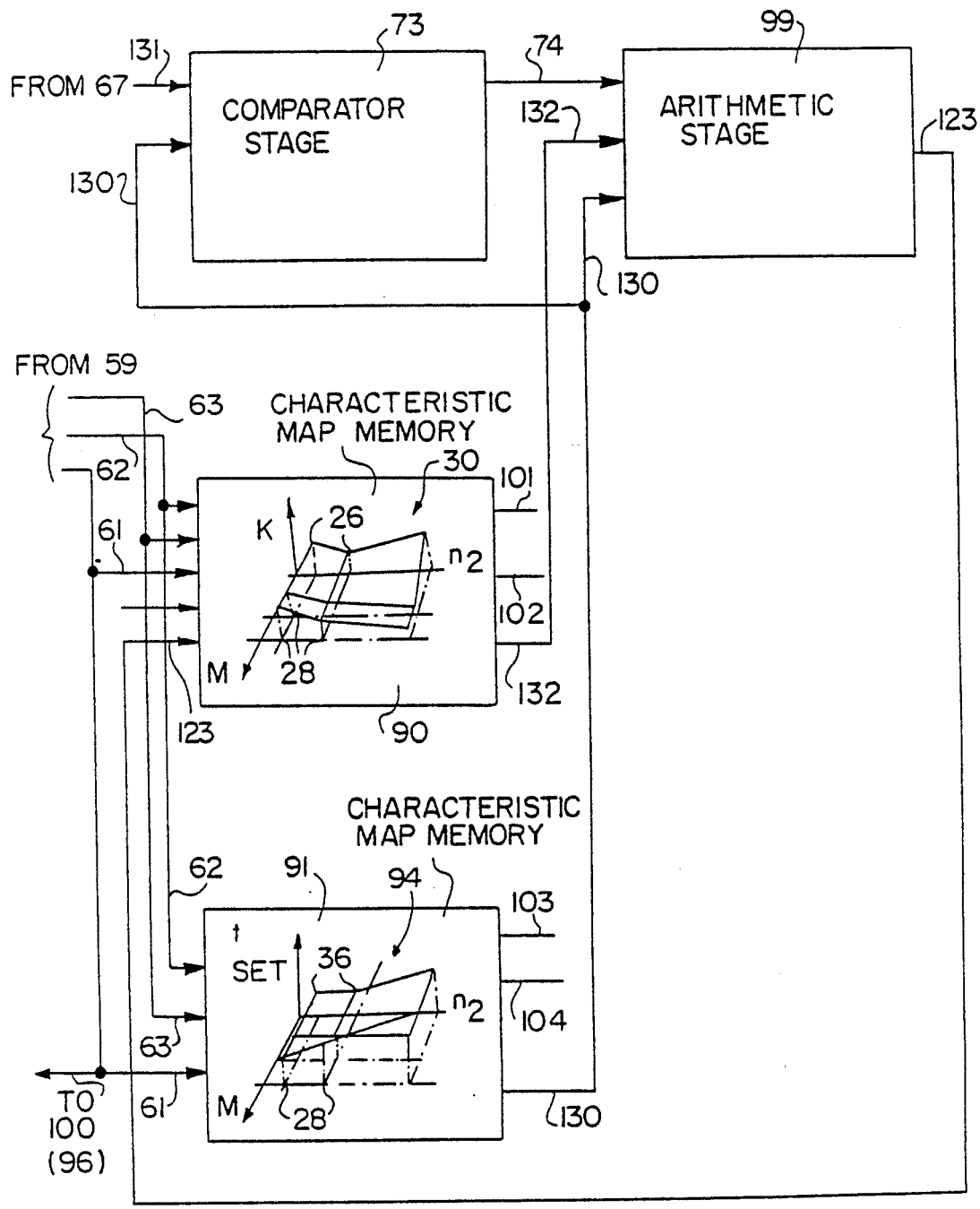
FIGS. 2-4 show the representation of three different circuits in the case of the first embodiment by major functional stages as parts of the block circuit diagram of FIG. 1.

For the case where, with the shift just described at one of the selected operating points 28, the deviation 71 of the actual value 68 from the set value 36 lies outside the tolerance window 81, 82, the following arrangement is made (See FIG. 2).

An arithmetic stage 99 is provided for the determination of a new correction value $K_{new}$, which is connected on an input side thereof to comparator stage 73 via a line 74 and to lines 130 and 132 of memories 91,90 and on an output side thereof to an input of the memory 90 via a line 123.

With deviation 71 lying outside the tolerance window 81, 82, the comparator stage 73 switches the actual value 68 of the shift time to the arithmetic stage 99, at which the set value 36 and the old correction value 26 are still present in the form of signals via the lines 130 and 132. The arithmetic stage 99 provides, at its output connected to the line 123, a signal which corresponds to new correction value $K_{new}$, which is dependent the old correction value K, which was entered up to the preceding shift at the selected operating point 28 concerned, according to a relationship $K_{new} = (t_{actual}/t_{set}) \cdot K$. This new correction value $K_{new}$ is entered into the selected operating point 28 of the characteristic map 30 of the preceding shift via the line 123.

Figure 3:
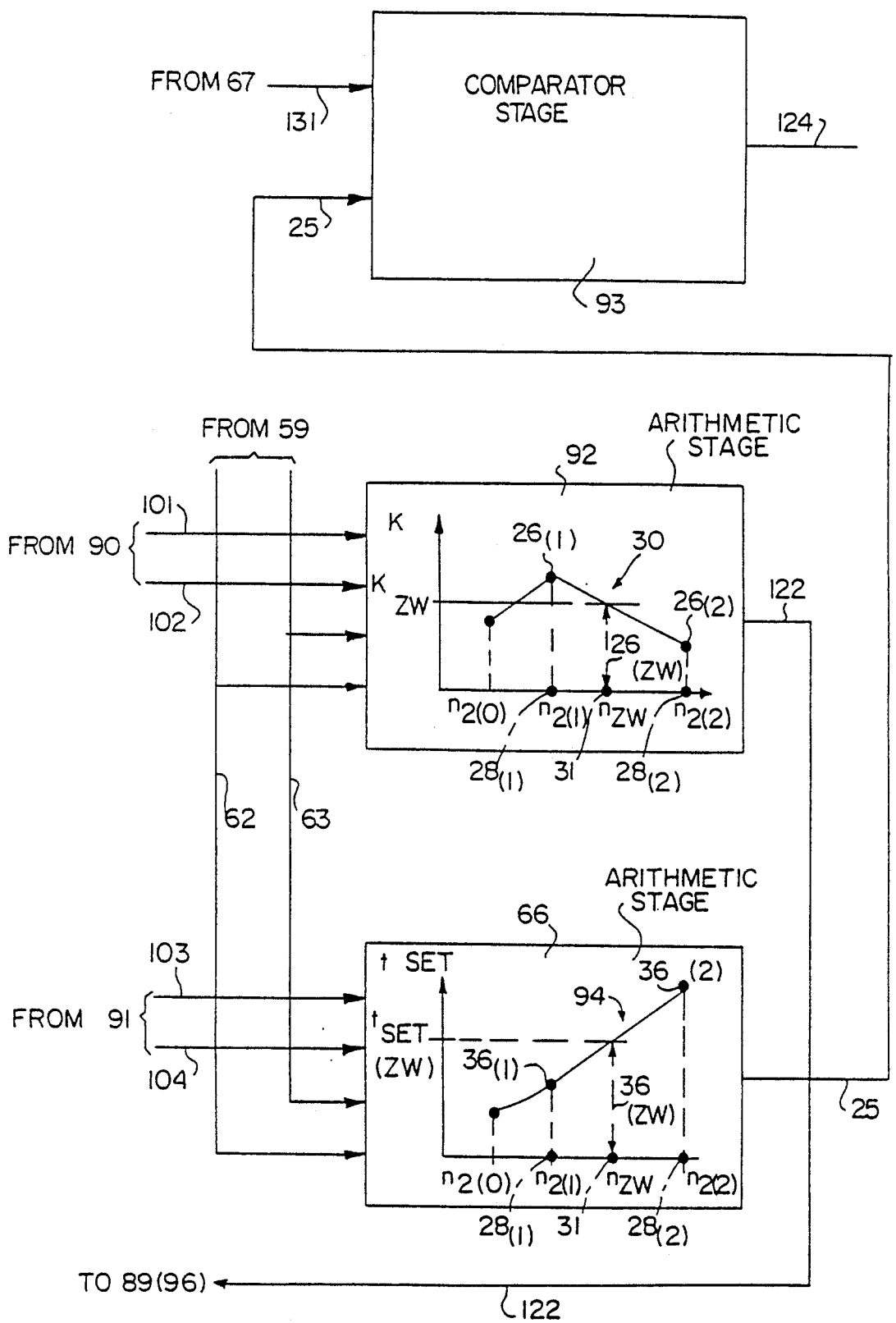
Figure 10:
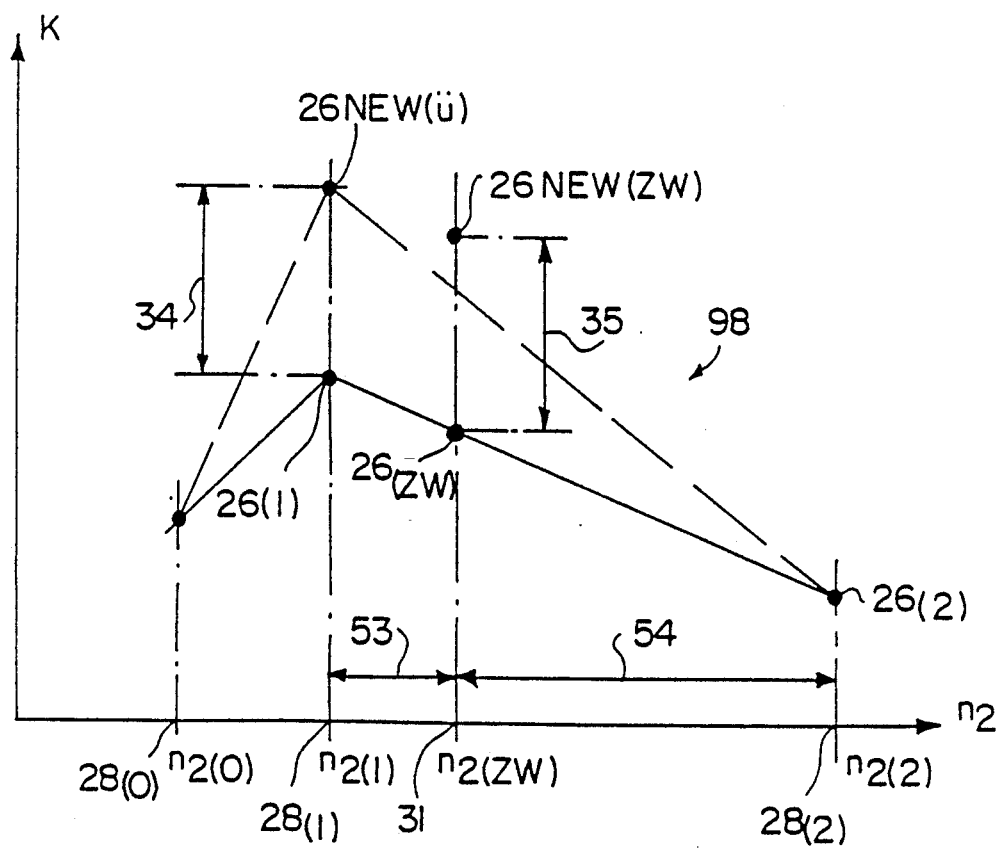
FIG. 10 illustrates the function of a transfer stage in the block circuit diagram of FIG. 1.

Furthermore, for the case where the motor vehicle occupies a driving state in which a shift line 60 is not followed at one of the nine selected operating points 28, but at a non-selected operating point 31, for example, at a gearbox output speed $n_{2(zw)}$, which according to FIG. 10 lies between gearbox output speeds $n_{2(1)}$ and $n_{2(2)}$, the following arrangement is made (See FIG. 3).

An arithmetic stage 66 for the respective interpolation of an intermediate set value ($t_{set(zw)}$) from the two set value $t_{set(1)}$ and $t_{set(2)}$ of the shift time of the two selected operating points 28 neighboring the non-selected operating point 31 and having the coordinate values $n_{2(1)}$ and $n_{2(2)}$ is provided. An arithmetic stage 92 for the respective interpolation of an intermediate correction value $K_{ZW}$ from the two correction values $K_{(1)}$ and $K_{(2)}$ of the neighboring two selected operating points 28 having coordinate values $n_{2(1)}$ and $n_{2(2)}$ is provided. Furthermore, a comparator stage 93 is provided for a comparison with the respective intermediate set value $t_{set(ZW)}$ of the set value. The output of the arithmetic stage 66 is connected via a line 25 to one input of the comparator stage 93, the other input of which is connected to line 131 leaving the measuring stage 67. The output of arithmetic stage 92 is connected by a line 122 to the output 126 via one of the output stages 96. A line 124 is connected to an output of the comparator stage 93. The arithmetic stage 66 is connected on an input side thereof both to the lines 62 and 63 leaving the detection stage 59 and to two lines 103 and 104 leaving outputs of the memory 91.

The arithmetic stage 92 is connected on an input side thereof likewise to the two lines 62 and 63 leaving the detection stage 59 as well as to the two lines 101 and 102 leaving outputs of the memory 90. The coordinate values $n_{2(ZW)}$ and $M_{d(ZW)}$ of the non-selected operating point 31 in the characteristic map 94 are inputted into the arithmetic stage 66 via the lines 62 and 63 and the set values $36_{(1)}$ and $36_{(2)}$ associated with the two selected operating points $28_{(1)}$ and $28_{(2)}$ neighboring the non-selected operating point 31 in the characteristic map 94 are inputted via the lines 103 and 104. From these data of the characteristic map 94, the arithmetic stage 66 interpolates the intermediate value $36_{(ZW)}$ of the set value associated with the non-selected operating point 31, to which the comparator stage 93 is wired via the line 25.

The function of the arithmetic stage 66 is shown in a simplified manner for easier understanding. The non-selected operating point 31 generally lies in the $n_2$-$M_d$ plane determined by the $n_2$ axis and the $M_d$ axis of the three-dimensional system of coordinates. This position is additionally taken into account in the arithmetic stage 66 by the processing of the $M_{d(ZW)}$ coordinate value. This simplified representation also applies to the explanation of the function of the arithmetic stage 92, to which, in turn, the coordinate values $n_{2(ZW)}$ and $M_{d(ZW)}$ of the non-selected operating points 31 in the characteristic map 30 are inputted via the lines 62 and 63. The arithmetic stage 92 is, furthermore, provided, via the lines 101 and 102, with the correction values $26_{(1)}$ and $26_{(2)}$ of the two selected operating points $28_{(1)}$ and $28_{(2)}$ neighboring the non-selected operating point 31 in the characteristic map 30. From these data of the characteristic map 30, the arithmetic stage 92 interpolates the intermediate value $26_{(ZW)}$ of the correction value associated with the non-selected operating point 31, which value is provided at the output 126 via the line 122 and is received via the line 65 by the pressure control valve 89 upon the instantaneous shifting.

The comparator stage 93 operates in principle in the same way as the comparator stage 73. However, the intermediate value $36_{(ZW)}$ available via the line 25 is used for the set value/actual value comparison, it also being possible for the threshold values of the tolerance window for the actual value 68 of the measuring stage 67, available via the line 131, to be designed differently from the comparator stage 73. If this actual value 68 lies within the tolerance window, no signal is provided at the output of the comparator stage 93, so that there is no adaptation of the characteristic map 30.

For the case where, after the shift just described at a non-selected operating point 31, a deviation outside the tolerance window was measured, the following arrangement is made. (See FIG. 4.)

The line 25 from arithmetic stage 66 and the line 122 from arithmetic stage 92 as well line 124 from comparator stage 93 are connected to associated inputs of an arithmetic stage 97. An output side of arithmetic stage 97 is connected, via a line 27, together with the lines 62 and 63 from detection stage 59, to corresponding inputs of a transfer stage 98, also provided as well, which is also connected on an input side thereof to the lines 101 and 102 of memory 90 and is connected at an output side thereof via a line 32 to an input of memory 90.

The arithmetic stage 97 determines a new correction value $K_{new(ZW)}$, associated with the non-selected operating point 31, from the set value ($t_{set(ZW)}$), available via the line 25, of the non-selected operating point 31 and from the correction value $K_{ZW}$, available via the line 122, of the non-selected operating point 31 as well as from the actual value $t_{actual}$ available via the line 124, according to the following relationship:

$$K_{new(ZW)} = (t_{actual}/t_{set(ZW)}) \cdot K_{ZW}.$$

The transfer stage 98 determines a difference value $35 = (K_{new(ZW)} - K_{ZW})$ and a position coordinate 53 of the nearest selected operating point $28_{(1)}$, as shown in FIG. 10. For this nearest operating point $28_{(1)}$, the transfer stage 98 determines a new transferred correction value ($K_{new(ii)}$), which differs from the previous correction value $26_{(1)}$ of the nearest selected operating point $28_{(1)}$ by a difference value 34. For reasons of damping, in the exemplary embodiment the difference value 34 is made equal to the difference 35. The new transferred correction value ($K_{new(ii)}$) is entered in the memory 90 via the line 32.

Figure 11:
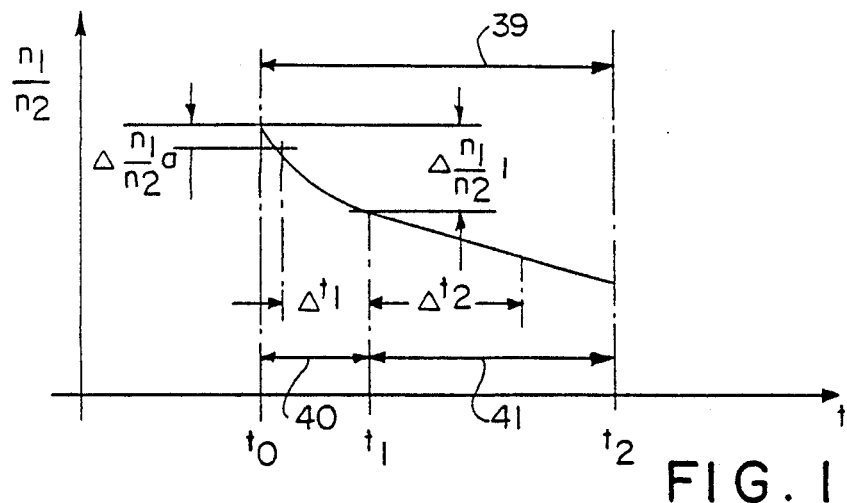
FIG. 11 shows a variant of the control according to the invention of the speed-change gear according to FIGS. 1 to 10 as a second embodiment.
Figure 12:
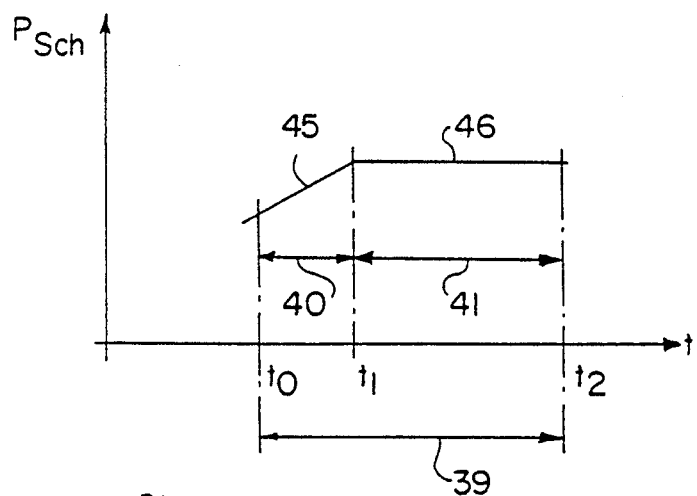
FIG. 12 shows a variant of the control according to the invention of the speed-change gear according to FIGS. 1 to 11 as a third embodiment.

In the case of a further embodiment of the invention according to FIGS. 11 and 12, deviating from the process and the arrangement according to the description above, a separate set value/actual value comparison is carried out for each of two successive shift phases 40 and 41 lying within shift time 39 for providing a respective determination of correction values 45 and 46, respectively. In this embodiment, the shifting pressure $P_{sch}$ is correspondingly corrected phasewise.

While, in the shift phase 40, the measurement of the actual value 68 is performed by registering the duration $\delta t_1$ of the change in the gear transmission $n_1/n_2$, and therefore coincides with the embodiment of FIG. 1–5. The actual value 68 for the second shift phase 41 is determined by a different time-measuring method. For both shift phases 40 and 41, a special set of characteristic maps for set values and correction values are required in each case, which are used, according to the embodiment of FIG. 1, for modulating the shifting pressure and, in cases of inadmissible deviations of the shift time, for adaptation of the correction values.

Figure 13:
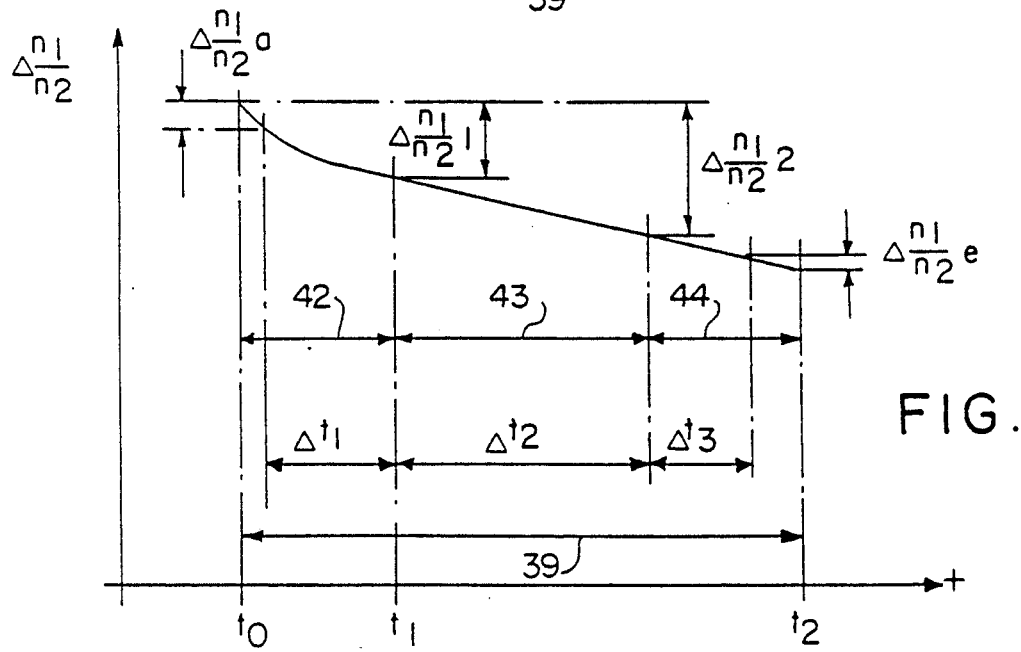
FIG. 13 shows a variant of the control according to the invention of the speed-change gear according to FIGS. 1 to 10 as a fourth embodiment.

In the case of a further embodiment of the invention according to FIG. 13, the shift time 39 is subdivided into three successive phases 42, 43 and 44, in each of which the actual value 68 of the shift subtime is measured by registering the duration $\delta t_1$ and $\delta t_2$ and $\delta t_3$ of the change in the gear transmission $n_1/n_2$ For each of the three shift phases 42, 43 and 44, six sets of characteristic maps for set values and correction values are necessary in each case, which are used, according to the embodiment of FIG. 1, for influencing the shifting pressure and, if appropriate, for adaptation of the characteristic maps for the correction values. This embodiment of FIG. 13 takes into account, in an advantageous way, the friction value fluctuations on the friction elements, occurring at the beginning and end of the shift.

Figure 14:
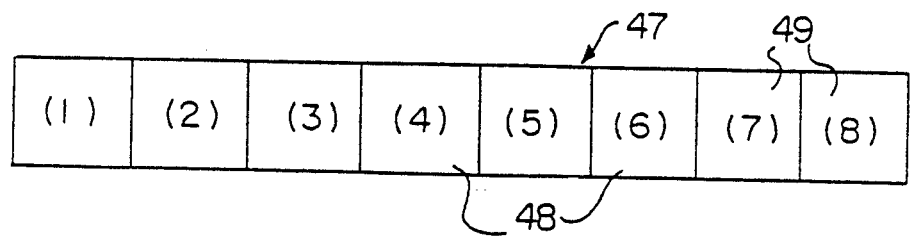
FIG. 14 shows a variant of the control according to the invention of the speed-change gear according to FIGS. 1 to 13 as a fifth embodiment.

In the case of a further embodiment of the invention according to FIG. 14, a common memory is provided for the characteristic maps 30 and 94 of correction values and set values, in which memory the subdivison in a memory word 47 is made such that six memory locations 48 are used for the entry of correction values 26 of a characteristic map 30 and two memory locations 49 are used for the entry of set values 36 of a characteristic map 94. Since the six characteristic maps 30 altogether contain only 54 selected operating points 28, a free memory capacity remains for ten additional correction values. The four possible set values 36 of the memory locations 49 are assigned to the nine selected operating points 28 according to certain aspects The distribution of the selected operating points 28 in the Md-$n_2$ plane determined by the axes Md and $n_2$ of the three-dimensional system of coordinates is not uniform, but closer in regions sensitive in terms of shifting quality.

Figure 16:
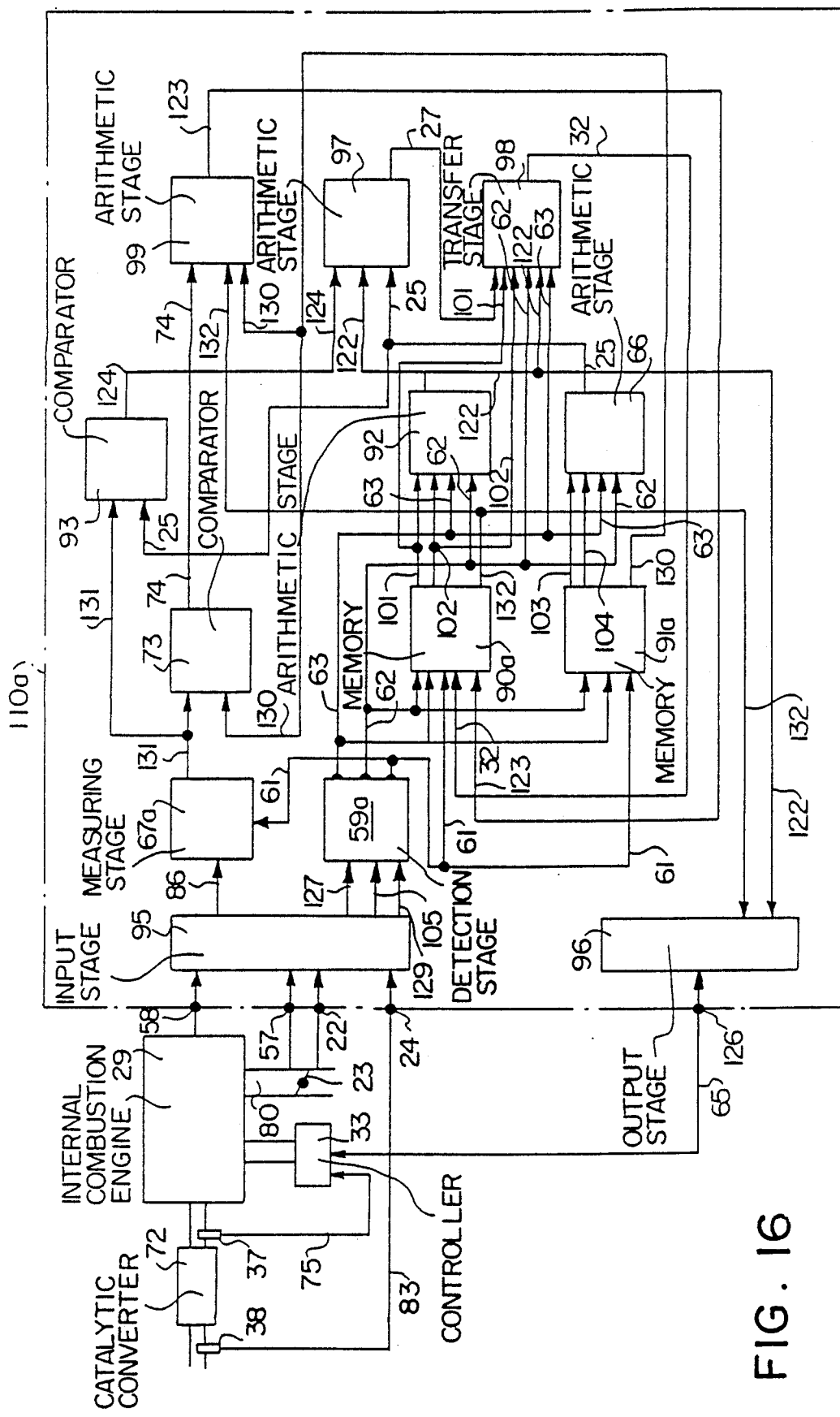
FIG. 16 shows the representation of the process and of the arrangement according to the invention in a seventh embodiment for the control of an internal-combustion engine with an exhaust catalytic converter and with a λ probe ahead of and after the exhaust catalytic converter by a block circuit diagram.
Figure 17:
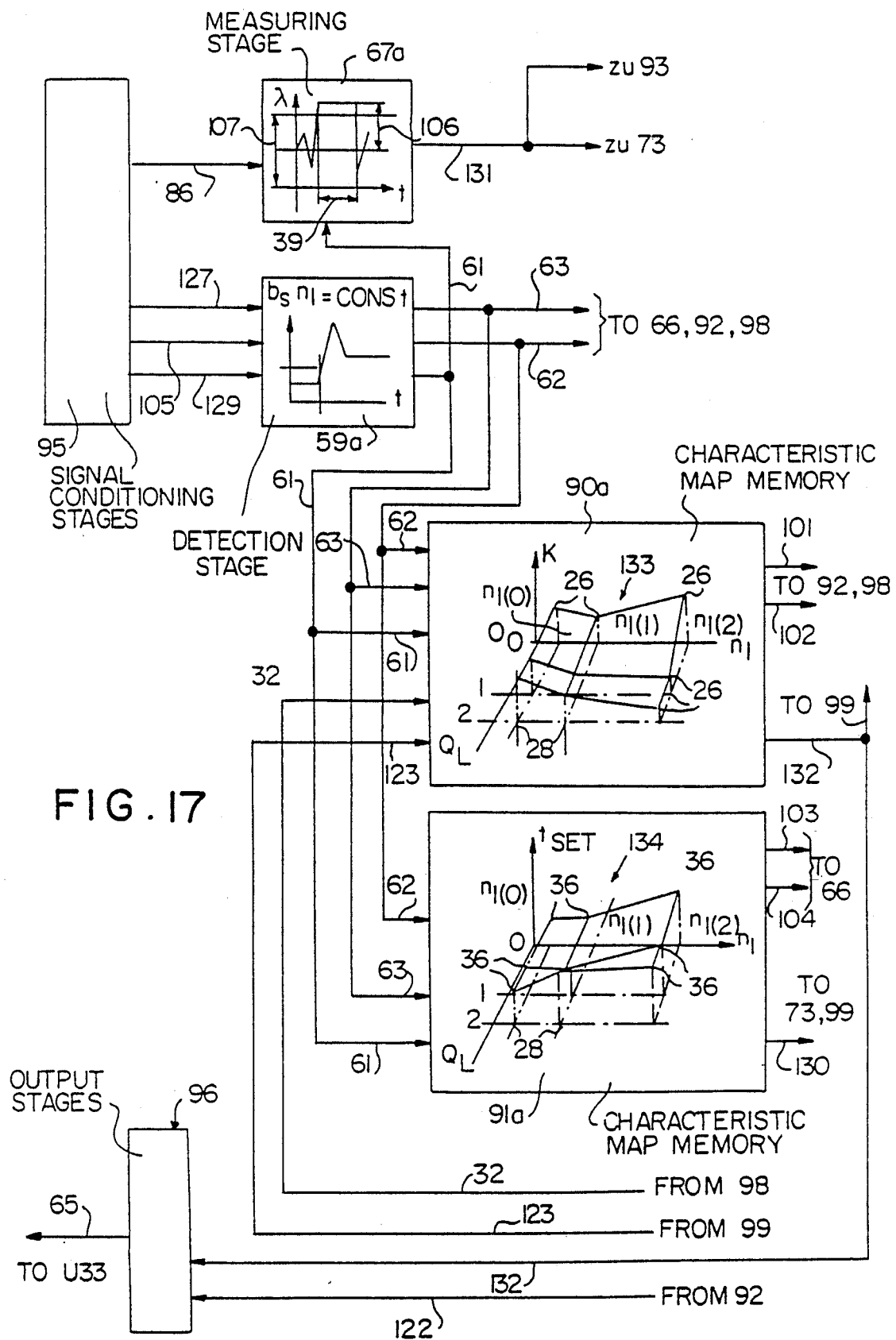
FIG. 17 illustrates functional stages in the block circuit diagram of FIG. 16.

In FIGS. 16 and 17, the application of the process and arrangement according to a further embodiment of the invention to an internal-combustion engine 29 with an exhaust catalytic converter 72 is shown diagrammatically. In the exhaust system of this internal combustion engine 29, a λ probe (control probe) 37 is arranged upstream of the exhaust catalytic converter 72. In case of deviations of an air-fuel mixture composition from a stoichiometric air/fuel ratio, that is whenever the air-fuel ratio λ is not equal to 1, the probe emits an output signal via a line 75 to a λ controller 33, which sets the rate of injection of fuel quantity, over in dependence on the signal, taking into account a quantity $Q_L$ of combustion air taken in over time by the internal-combustion engine 29 via an intake system 80.

In the exhaust system of the internal-combustion engine 29, there is arranged downstream of the exhaust catalytic converter 72 a further λ probe (test probe) 38, which measures the residual oxygen content of the exhaust gas and in cases of deviations from the stoichiometric ratio, emits a test probe signal, which is switched via a line 83 to an input 24 of an electronic control unit 110a.

A signal, representative of the acceleration $b_S$ of a flowmeter pressure plate 23, which is arranged in the intake system 80 and is used for measuring the quantity $Q_L$ of combustion air taken in over time, can be switched to a further input 22 of the control unit 110a. A signal representative of the quantity $Q_L$ of combustion air taken in over time, and thus on the instantaneous torque load of the internal-combustion engine 29, can be switched to an additional input 57 of the control unit 110a. Also, a signal representative of the instantaneous speed $n_1$ of the internal-combustion engine 29 can be switched to another input 58 of the control unit 110a. The control unit 110a has signal conditioning stages 95, connected to inputs 22, 24, 57 and 58, and an output 126 for providing correction values, which is connected to output stages 96 of control unit 110a and is connected via a line 65 to the λ controller 33. In the λ controller 33, the signals provided by lines 65 and 75 are used to set the air-fuel ratio λ to a value of about 1.

The signal conditioning stages 95 are connected by a line 86 to a measuring stage 67a, which is used for determining the actual value of a time interval 39 seen in FIG. 17 and thus corresponds to the measuring stage 67 of the embodiments of FIGS. 1 to 15 discussed above. The line 86 carries a signal representative of a deviation 106 of the air-fuel mixture composition from a stoichiometric ratio, determined by the test probe 38. The measuring stage 67a determines the time interval 39 during which this deviation 106 lies outside an admissible tolerance window 107 on both sides of the λ value 1 as shown in FIG. 17.

As in the case of the exemplary embodiments discussed above, the output of the measuring stage 67a emitting a signal corresponding to the actual value of the time interval 39 is connected via a line 131 to two comparator stages 73 and 93.

The control unit 110a includes a detection stage 59a for a non-steady operating state of the internal combustion engine 29 and is connected to the signal conditioning stages 95 via lines 105, 127 and 129. Signals corresponding to the deflection speeds or accelerations of the flowmeter pressure plate 23 are continuously transmitted via the line 105. A continuous signal transmission is also performed via line 127 for the speed $n_1$ of the internal-combustion engine 29 as well as via line 129 for the quantity $Q_L$ of combustion air taken in over time. The detection stage 59a responds to the occurrence of a positive or negative acceleration $b_S$ of the flowmeter pressure plate 23, if at the same time the speed $n_1$, of the internal-combustion engine remains constant. In this case, output signals occur at outputs of the detection stage 59a respectively connected to a line 61 and to lines 62 and 63, a clock signal being provided on the line 61, an output signal corresponding to a coordinate value of the speed $n_1$ being provided on the line 62 and an output signal corresponding to a coordinate value of the quantity $Q_L$ of combustion air over time being provided on the line 63.

The control unit 110a comprises furthermore memory 90a with stored characteristic maps 133 for the assignment of correction values 26 to selected operating points 28 of the internal-combustion engine 29 as well as memory 91a with stored characteristic maps 134 for the assignment of set values 36 of the time interval 39 to the selected operating points 28 of the internal-combustion engine 29. In the three-axis system of coordinates of the respective characteristic map 133, coordinate values $n_{1(x)}$ of the speed $n_1$ of the internal-combustion engine 29 are plotted on the x axis and correction values K for influencing the rate of fuel injection quantity by the controller 33 are plotted on the y axis and coordinate values $Q_L(Z)$ of the quantity $Q_L$ of combustion air over time are plotted on the z axis.

In the three-axis system of coordinates of the respective characteristic map 134 of memory 91a, coordinate values $n_{1(x)}$ of the speed $n_1$ of the internal-combustion engine 29 are plotted on the x axis and set values $t_{set}$ for the time interval 39 are plotted on the y axis and coordinate values $Q_{L(x)}$ of the quantity $Q_L$ of combustion taken in air over time by the internal-combustion engine 29 are plotted on the z axis. The coordinate values of the characteristic maps 133 and of the characteristic maps 134 are so identical that each of the selected operating points 28 are assigned both a correction value 26 and a set value 36 respectively. One or more characteristic maps 133 and one or more characteristic maps 134 may be provided for the entire operating range of the internal combustion engine 29. For addressing the characteristic map 133 or 134 associated with the respective non-steady operating state, the memory arrangement, including the memories 90a and 91a, is connected to line 61 of the detection stage 59a. For addressing the memory locations associated with the respective selected operating point 28, the coordinate signals generated by the detection stage 59a are switched via lines 62 and 63 to the memory arrangement 90a/91a.

For the case where the non-steady operating point occurs at one of the selected operating points 28, a correction signal occurs at an output of the memory 90a connected to a line 132. The line 132 is connected via one of the output stages 96 to the output 126, so that the λ controller 33 receives this correction signal. In addition, a set value signal occurs at an output of the memory 91a connected to a line 130, which signal is consequently present at the one input of the comparator stage 73. If the measuring stage 67a activated by the clock signal of line 61 from the detection stage 59a has determined an actual value signal after the end of the non-steady operating state on account of an inadmissible deviation 106, this signal is inputted at the other input of the comparator stage 73 connected to the line 131.

The functional stages described thus far of the control unit 110a for determining the correction value 26 for the case where the non-steady operating state, i.e. in this case in which the vehicle is accelerated or decelerated by the power control of the internal-combustion engine 29, occurs at one of the selected operating points 28 thus correspond to the corresponding functional stages of the control unit 110 of the exemplary embodiments discussed above of FIGS. 1 to 15. In the other functional stages as well, however, the control units 110 and 110a correspond to each other, so that the same reference numerals are used for corresponding functions and, for further explanation, reference can be made to the description of the embodiments above.

Thus, first of all the output of the comparator stage 73 is connected via a line 74 to an input of an arithmetic stage 99 for the determination of a new correction value $K_{new}$, which is also connected at an input side thereof to line 130 for the set value 36 of the characteristic maps 134 and to the line 132 for the correction value 26 of the characteristic maps 133. Consequently, if the comparison in the comparator stage 73 produces an inadmissible deviation, the arithmetic stage 99 determines a new correction value $K_{new}$, which is entered in the memory 90a for the selected operating point 28 concerned, via line 123 connected to an output of the arithmetic stage 99 (cf. in particular also FIG. 2).

For the case where the non-steady operating state occurs at a non-selected operating point 31 of the internal-combustion engine 29, there are provided in the control unit 110a, arithmetic stages 92 and 66 for the respective determination of intermediate correction values $K_{ZW}$ and set values $t_{set(ZW)}$ for this non-selected operating point 31 (cf. in particular also FIG. 3).

Via the lines 62 and 63 of the detection stage 59a, the coordinate signals of the non-selected operating point 31 are switched to corresponding inputs of the arithmetic stage 92. Via the lines 101 and 102 of the memory 90a, the correction values of two selected operating points 28, neighboring the non-selected operating point 31, including their coordinate values, are inputted into the arithmetic stage 92, which determines from these data a correction value $K_{ZW}$ associated with the non-selected operating point 31, which value is switched, via a line 122, connecting an output of the arithmetic stage 92 to one of the output stages 96, for transmission to the λ controller 33.

In order to be able, if appropriate, to perform an adaptation of the characteristic maps 133 after completion of such a non-steady operating state triggered at a non-selected operating point 31, the following arrangement, coinciding with the arrangement of the embodiments discussed above, is also made in the control unit 110a as discussed below.

The coordinate signals of the non-selected operating point 31 are switched via the lines 62 and 63 of the detection stage 59a to inputs of the arithmetic stage 66. Via lines 103 and 104, connected to outputs of the memory 91a, the corresponding signals of set values of both the selected operating points 28 neighboring the non-selected operating point 31 and their coordinate values are switched to inputs of the arithmetic stage 66. From these input signals, the arithmetic stage 66 determines a set value $t_{set(ZW)}$, associated with the non-selected operating point 31, which value is switched via line 25 to one input of a comparator stage 93, at the other input of which is the actual value signal of line 131 of the measuring stage 67a.

Figure 4:
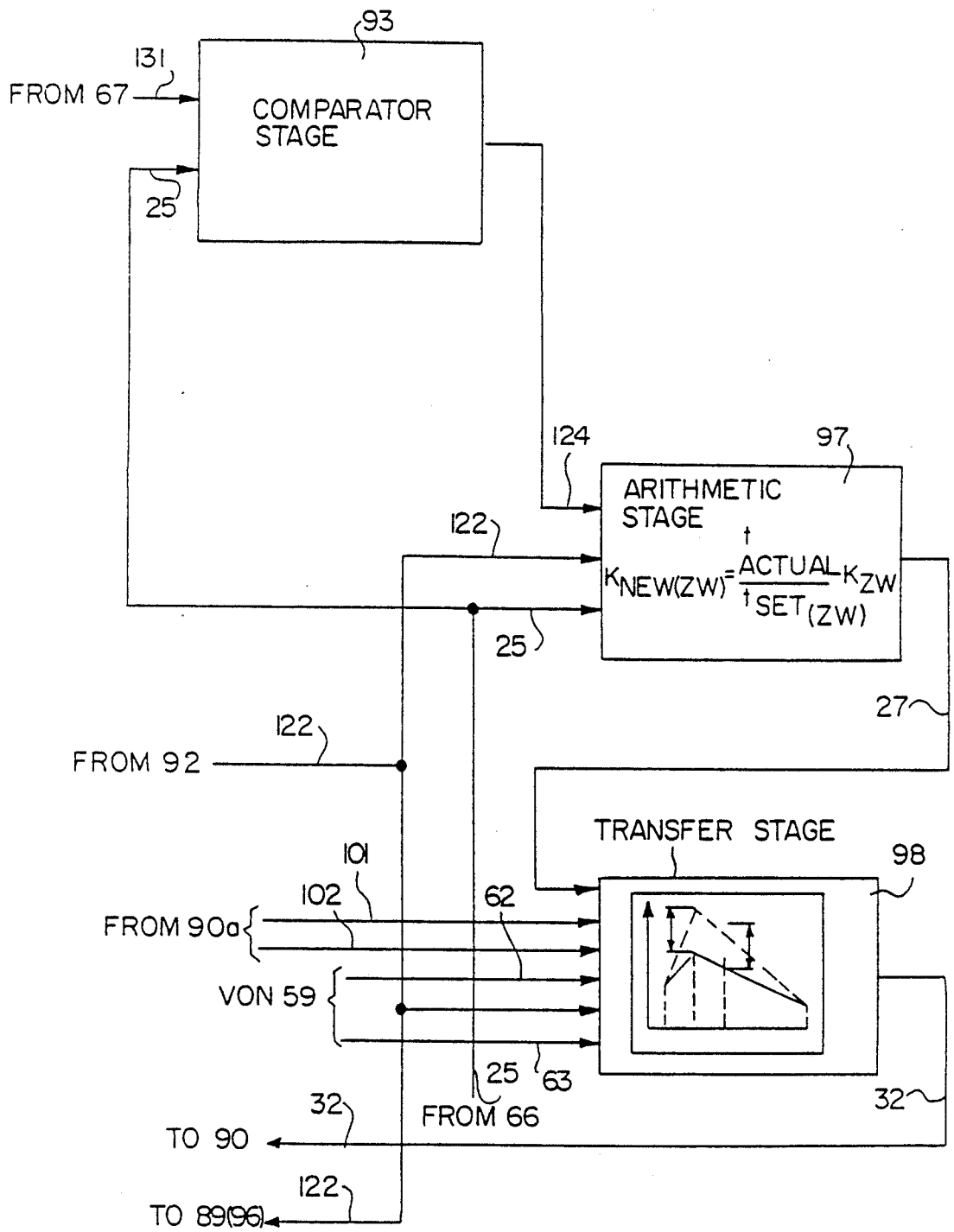

In the case of a deviation exceeding an admissible amount, the comparator stage 93 delivers a signal at an output thereof which corresponds to the actual value of the time interval 39 and is switched via a line 124 to an input of an arithmetic stage 97 for the determination of a new correction value $K_{new(ZW)}$, associated with the non-selected operating point 31 (cf. in particular also FIG. 4).

The set value signal of the line 25 of the arithmetic stage 66 and the correction value signal of the line 122 of the arithmetic stage 92 are inputted into the arithmetic stage 97 via further inputs. The arithmetic stage 97 delivers at an output thereof a signal which corresponds to the new correction value $K_{new(ZW)}$ of the non-selected operating point 31, determined from the input data and is switched by a line 27 to an input of a transfer stage 98. In further coincidence with the embodiments above, this transfer stage 98 is connected on an input side to the signal lines 62 and 63 of the detection stage 59a and to the signal lines 101 and 102 of the memory 90a as well as to the signal line 122 of the arithmetic stage 92. As already explained in the case of the exemplary embodiments discussed above with reference to FIGS. 1, 4 and 10, the transfer stage 98 determines from these input data a new transferred correction value $K_{new(ii)}$ for the nearest selected operating point 28 to the non-selected operating point 31, which value is entered in the memory 90a via a line 32.

Figure 18:
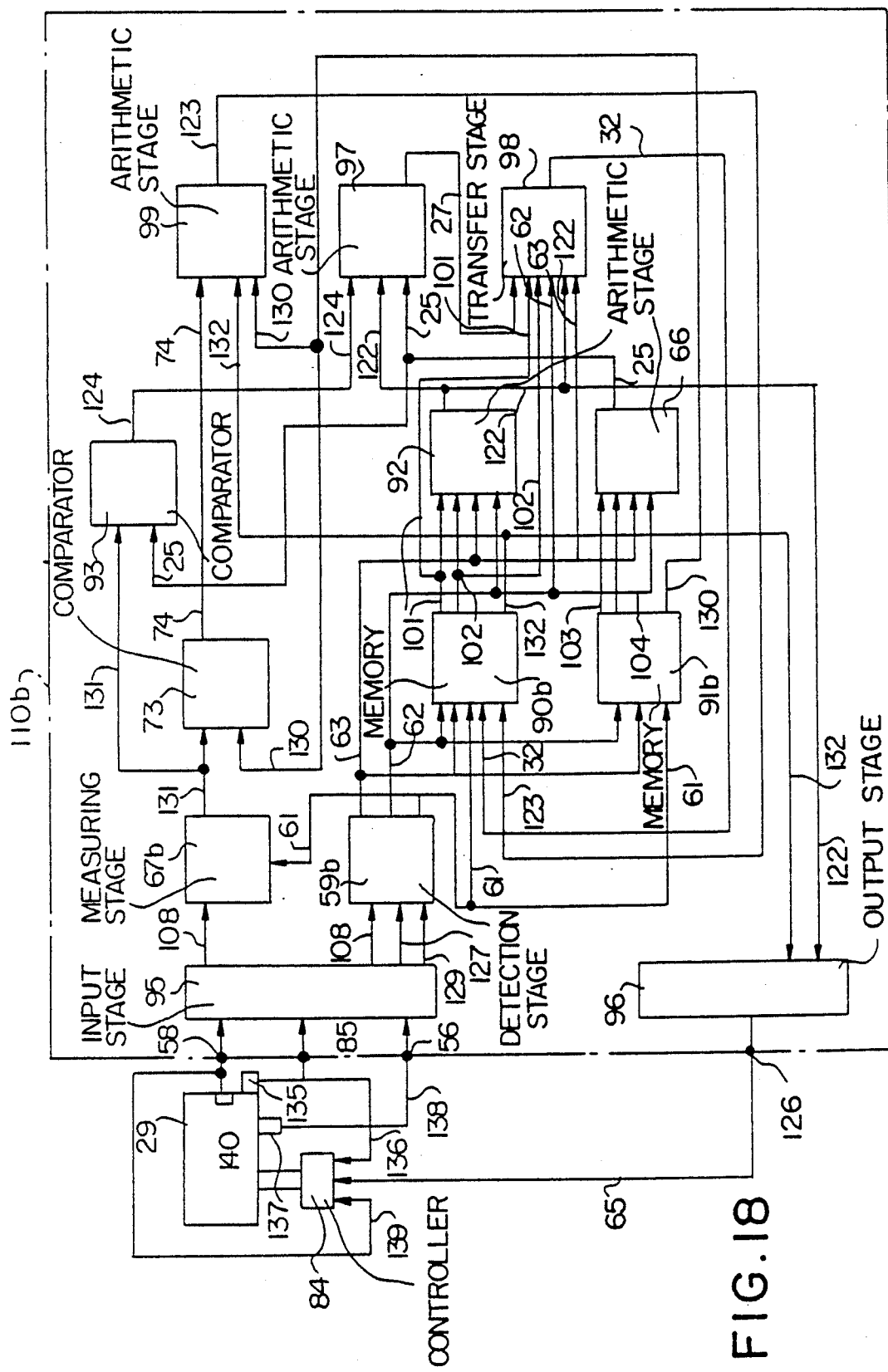
FIG. 18 shows the representation of the process and the arrangement according to the invention in an eighth embodiment for the control for an internal-combustion engine with a control mechanism to avoid abnormal combustion by a block circuit diagram.
Figure 19:
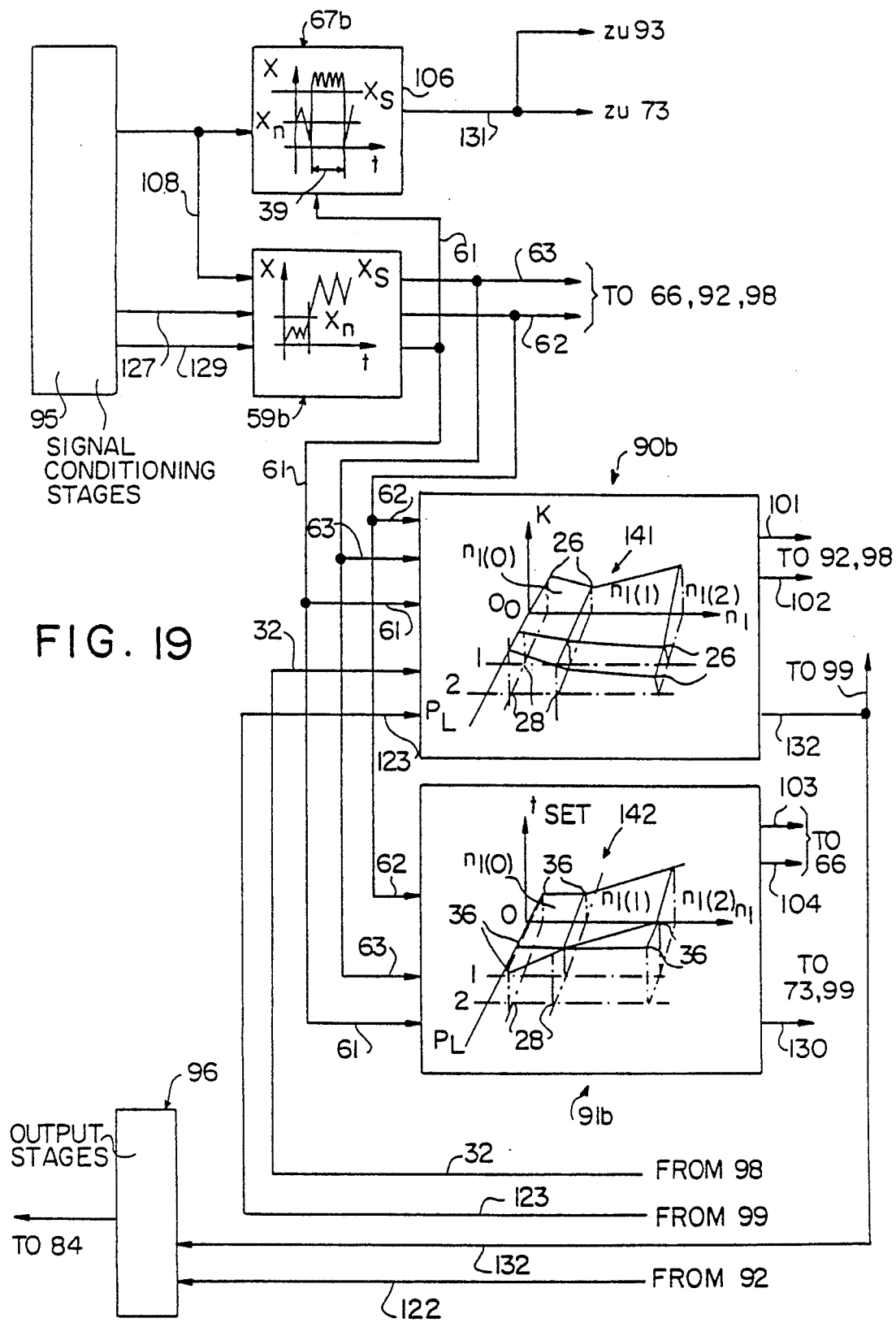
FIG. 19 shows an explanation of functional stages in the block circuit diagram of FIG. 18.

In FIGS. 18 and 19, a further embodiment of the process and arrangement is shown diagrammatically as applied to an internal-combustion engine 29 with a controller 84 for influencing the combustion in the combustion chambers to avoid abnormal combustion or so-called knocking.

The controller 84 is connected via a line 136 to a signal transmitter 135, which is able to register a parameter dependent on the combustion in the combustion chambers, for example the pressure and/or temperature conditions prevailing in the combustion chambers, and to generate an output signal corresponding to such a parameter value. The controller 84 is, furthermore, connected via a line 139 to a speed sensor 140, which delivers an output signal corresponding to a respective engine speed $n_1$. The controller 84 uses this output signal as a reference signal, which represents the parameter value with optimal combustion in the combustion chambers for a comparison with the output signal of the line 136, if appropriate with measured value conversion of one or both signals. If the output signal of the knocking sensor 135 corresponds to conditions with abnormally high pressure and/or abnormally high temperature, according to the deviation, the controller 84 forms a correction signal for the lowering of the combustion pressure in the combustion chambers. This lowering of the combustion pressure in dependence on the correction signal can be achieved, for example as in German Patent Specification No. 3,049,980, by the reduction of the intake pressure or the charging pressure of the internal-combustion engine or, as in German Published Unexamined Patent Application 3,116,593, by adjusting the timing of the ignition point. The controller 84 is connected via a further line 65 to an output 126 of an electronic control unit 110b, which has inputs 56, 58 and 85.

The internal-combustion engine 29 has a signal transmitter 137, which emits an output signal corresponding to the intake pressure or charging pressure of the internal-combustion engine 29, which signal is switched via a line 138 to the input 56. The input 58 is connected to the speed signal line 139, while the input 85 is connected to the knocking signal line 136. From these input data, the control unit 110b delivers, at an output thereof 126, a further correction signal, which is provided by the line 65 with the correction signal of the controller 84 in the sense that the time interval of knocking combustion is reduced to a minimum or becomes zero.

The inputs 56, 58 and 85 are connected to signal conditioning stages 95, while the output 126 leaves output stages 96. The signal conditioning stages 95 are connected by a line 108 to a measuring stage 67b as well as by line 108 and further lines 127 and 129 to a detection stage 59b. The line 108 carries the signal x of the knocking sensor 135, so that the measuring stage 67b measures the time interval 39 in which a signal value $x_n$ indicating knocking combustion occurs, which value lies above the signal value corresponding to the normal or optimal combustion. At the output of the measuring stage 67b, connected to a line 131, there appears after the end of the knocking combustion, a signal corresponding to the actual value of the time interval 39 as seen in FIG. 19.

The line 127 carries a signal corresponding to the speed $n_1$ of the internal-combustion engine 29, while line 129 transmits a signal corresponding to the intake pressure or charging pressure of the internal-combustion engine 29. Consequently, upon occurrence of a knocking signal $x_S$, the detection stage 59b delivers via lines 62 and 63, at an output side thereof, the coordinate values $n_{1(x)}$ and $p_{L(z)}$ of the operating point, at which the internal-combustion engine 29 currently occupies, and via line 61 on an output side thereof provides a clock signal which activates the measuring stage 67b and is switched to memories 90b and 91b, which are likewise connected on an input side thereof to the lines 62 and 63 of the detection stag 59b.

In the memory 90b, characteristic maps 141 are stored for the assignment of correction values 26 to selected operating points 28 of the internal-combustion engine 29. In the three-axis system of coordinates of the respective characteristic map 141, seen in FIG. 19, the speed $n_1$ of the internal-combustion engine 29 is plotted on the x axis, the correction values K are plotted on the y axis and the intake pressure or charging pressure $p_L$ of the internal-combustion engine 29 is plotted on the z axis, the latter being a parameter indicative of the torque load. In the memory 91b, characteristic maps 142 are stored for the assignment of set values 36 to the selected operating points 28 of the internal-combustion engine 29. In the respective three-axis system of coordinates of the characteristic maps 142, the speed $n_1$ of the internal-combustion engine 29 is plotted on the x axis, the set values of the time interval 39 are plotted on the y axis and the intake pressure or charging pressure $p_L$ of the internal-combustion engine 29 is plotted on the z axis, the latter being a parameter indicative of the torque load.

The selected operating points 28 of a characteristic map 141 and the selected operating points 28 of a characteristic map 142 coincide in their coordinate values so much that each selected operating point 28 is assigned both a correction value 26 and a set value 36 respectively.

The functional stages described thus far of the control unit 110b for determining the correction value 26 for the case where the non-steady operating state, i.e. in this case knocking combustion, occurs at one of the selected operating points 28 thus likewise correspond to the corresponding functional stages of the control unit 110. In the other functional stages as well, however, the control units 110 and 110b correspond to each other, so that the same reference numerals are used for corresponding functions and, for further explanation, reference can be made to the description above with respect to FIGS. 1 to 17.

Upon the occurrence of knocking combustion, the detection stage 59b activates, via line 61, the memory 90b, which on the basis of the two coordinate values of lines 62 and 63 outputs a correction value 26 associated with the selected operating point 28 concerned. The correction value 26 is switched via line 132 on an output side of the memory 90b to one of the output stages 96 and to the controller 84.

For a possible adaptation of the characteristic map 141 after the end of the non-steady operating state, a comparison is performed in the comparator stage 73, connected by one input to line 131 and by its other input to line 130 of the memory 91b. The memory 91b outputs, on the basis of the input coordinate values of the lines 62 and 63, via line 130, a set value 36 associated with the selected operating point 28 concerned. For the case where the deviation exceeds an admissible amount, the comparator stage 73 emits an output signal corresponding to the actual value of the time interval 39, which signal is switched, via line 74, to arithmetic stage 99, which is also connected on an input side to line 130 of memory 91b and to the line 132 of the memory 90b. The arithmetic stage 99 determines a new correction value $K_{new}$, for example according to the relationship $K_{new} = (t_{actual}/t_{new}) \cdot K$. The new correction value is entered via line 123 at the point of the selected operating point 28 concerned of the characteristic map 141 of memory 90b.

For the case where knocking combustion occurs at a non-selected operating point 31 of the internal-combustion engine 29, the following arrangement is made for determining an associated correction value as described below (cf. also FIG. 3).

The arithmetic stage 92 determines a correction value $26_{(ZW)}$ from the correction values and coordinate values of the connected lines 101 and 102 of the memory 90b for the two selected operating points 28 neighboring the non-selected operating point 31, as well as from the coordinate values of the connected lines 62 and 63 for the non-selected operating point 31. The correction value $26_{(ZW)}$ is switched via line 122 at an output side of the arithmetic stage 92 to the controller 84 via one of the output stages 96.

For the case where, if appropriate, after the end of the non-steady operating state occurring at a non-selected operating point 31, an adaptation of the characteristic map 141 concerned has to take place, in turn the following arrangement is made as described below (cf. also FIG. 4).

The arithmetic stage 66 determines, from the set value data and coordinate data of both the selected operating points 28, neighboring the non-selected operating point 31, provided by connected lines 103 and 104 of the memory 91b, and from the coordinate data of the non-selected operating point 31 provided by connected lines 62 and 63 of the detection stage 59b, a set value $36_{(ZW)}$, associated with the non-selected operating point 31, which value is switched via the line 25 on an output side of the arithmetic stage 66 to one input of the comparator stage 93, which emits an output signal if the deviation of the actual value provided by connected line 131 exceeds an admissible amount. This output signal, corresponding to the actual value, is switched via the line 124 on an output side of the comparator stage 93 to arithmetic stage 97, which determines, from the actual value provided via line 25, the correction value provided via line 122, and the set value, a new correction value $K_{new(ZW)}$ associated with the non-selected operating point 31, for example according to the relationship $K_{new(ZW)} = (t_{actual}/t_{set(ZW)}) \cdot K_{ZW}$, which value is switched via line 27 on an output side to the transfer stage 98 (cf. also FIG. 10).

The transfer stage 98 determines from the coordinate values of the connected lines 101 and 102 for both the selected operating points $28_{(1)}$ and $28_{(2)}$ neighboring the non-selected operating point 31, as well on the basis of the coordinate values of the also connected lines 62 and 63 for the non-selected operating point 31, the position coordinate 53, as seen in FIG. 10, for the nearest selected operating point $28_{(1)}$, into which a new correction value $K_{new(ii)} = 26_{new(ii)}$ (FIG. 10) is to be transferred.

From the old correction value $K_{ZW}$ for the non-selected operating point 31, available via line 122, the transfer stage 98 determines a difference 35 from new and old correction value $26_{new(ZW)}$ and $26_{(ZW)}$ as seen in FIG. 10.

The new correction value $26_{new(ii)}$ to be transferred differs from the old correction value $26_{(1)}$ of the nearest selected operating point $28_{(1)}$ by a difference 34, which is approximately equal to the difference 35.

The new correction value $26_{new(ii)}$ to be transferred is entered via line 32 on an output side in the memory 90b at the point of the nearest selected operating point $28_{(1)}$ of the characteristic map 141.

Figure 20:
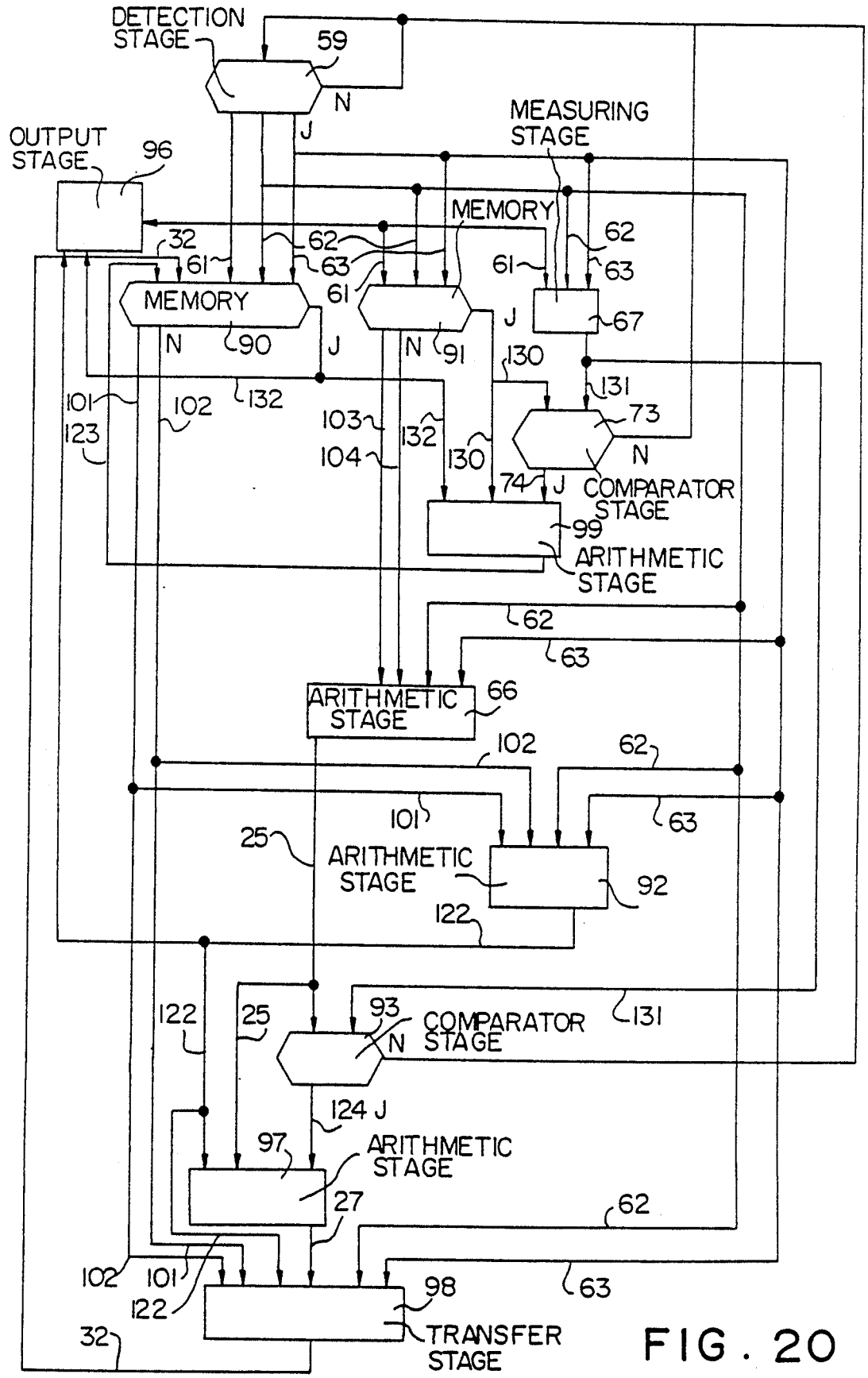
FIG. 20 shows a signal flow diagram associated with the block circuit diagram in FIG. 1 of the first embodiment.

Referring to FIG. 20, a signal flow diagram is shown accordingly to a generic embodiment of the present invention.

If a shift line stored in the detection stage 59 is exceeded, the stage leaves a waiting state and outputs signals 61, 62, 63. A gear speed shift signal 61 is present at stage 96, measuring stage 67 and memories 90, 91. The signals 62, 63 describing the operating state are connected to the measuring stage 67, the memories 90, 91, the arithmetic stages 66, 92 and the transfer stage 98.

If the instantaneous operating point is at a selected operating point stored in characteristic maps of the memories 90, 91, the following signals are output by the memories 90, 91:

Memory 90 outputs a correction value associated with the selected operating point via line 132. The latter is connected to the stage 96 for valve actuation and to arithmetic stage 99

Memory 91 outputs the set values associated with a selected operating point via the line 130. The latter is connected to comparator stage 73 and to the stage 99. The comparator stage 73 compares the actual value 131 from the measuring stage 67, likewise connected to comparator stage 93, with the set value 130.

If the actual value is not outside a tolerance window, a return is made to the detection stage 59 and, a correction does not take place.

If the actual value is outside the tolerance window, the signal 74 is outputted from comparator stage 73, with which a new correction value for the selected operating point is calculated in the arithmetic stage 99 with the signals 132, 130.

This new correction value is entered in the memory 90 via line 123, and assigned to the selected operating point.

If the instantaneous operating point does not lie at a selected operating point, the correction value and the set value are interpolated from the correction values and set values associated with neighboring operating points in arithmetic stage 92 and 66. Lines 101 and 102 for the correction values, starting from the memory 90, are connected to arithmetic stage 92 and transfer stage 98 The lines 103 and 104 for the set values, starting from the memory 91, are connected to arithmetic stage 66.

The correction value for the instantaneous operating point, interpolated in arithmetic stage 92, is fed via line 122 to output stage 96 and to arithmetic stage 97 and transfer stage 98.

The comparator stage 93 compares the set value 25 with the actual value 131. If the actual value is not outside the tolerance window, a return is made to the detection stage 59 a correction does not take place.

If the actual value is outside the tolerance window, the signal 124 is outputted and a new correction value is calculated in arithmetic stage 97. This value is fed via line 27 to transfer stage 98. The latter enters the new correction value in the memory 90 via the line 32.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A process for adaptive control of a drive component in a motor vehicle having an internal-combustion engine, the drive component having a critical time interval with respect to a controlled variable for a predefined operating behavior of the drive component at selected operating points, the process comprising the steps of:

detecting an occurrence of a non-steady operating state of the drive component using a detection means (59);

obtaining a selected set value for the critical time interval from a memory means (91) upon detecting said non-steady operating state for one of the selected operating points, said memory means storing a first characteristic map of set values assigned to the selected operating points of the internal-combustion engine including speed and load information on the selected operating points;

obtaining an actual value for the critical time interval from a measuring means (67) upon detecting said non-steady operating state for the one selected operating point;

comparing said selected set value with the actual value in a comparison means (73) and determining whether any deviation exceeds a threshold value;

calculating a selected updated correction value for controlling the controlled variable with regard to the predefined operating behavior using an arithmetic means (99) if said deviation exceeds the threshold value;

entering (123) said selected updated correction value into a second characteristic map for correction values assigned to the selected operating points of the internal combustion engine and using said selected updated correction value to control the controlled variable (132) for a subsequent non-steady operating state of the drive component at its assigned selected operating point wherein a new selected updated correction value is entered for each occurrence of a subsequent non-steady operating state having a deviation exceeding the threshold value;

interpolating selected set values received from said memory means (91) for selected operating points neighboring a non-selected operating point in a second arithmetic means (66) to obtain a non-selected set value ($t_{set(ZW)}$) (25) for a non-steady operating state occurring at the non-selected operating point;

interpolating selected correction values received from a second memory means (90) for selected operating points neighboring the non-selected operating point in a third arithmetic means (92) to obtain a non-selected instantaneous correction value ($K_{ZW}$) (122) for the non-steady operating state occurring at the non-selected operating point;

controlling said controlled variable (122) with said non-selected instantaneous correction value;

comparing said non-selected set value ($t_{set(ZW)}$) with the actual value in a second comparison means (93) and determining whether any deviation exceeds the threshold value;

calculating a theoretical new correction value ($K_{new(ZW)}$) in a fourth arithmetic means (97) for the non-selected operating point when the deviation exceeds the threshold value;

calculating a transferred correction value ($K_{new(u)}$) in a transfer stage means (98) from the theoretical new correction value ($K_{new(ZW)}$) taking into account positional deviation of the non-selected operating point relative to the neighboring selective operating points;

entering in the second characteristic map said transferred correction value ($K_{new(u)}$) at one of said neighboring selected operating points; and employing the selected updated correction value and the non-selected instantaneous correction value for controlling the drive component of the motor vehicle.

2. A process according to claim 1, further comprising the steps of:

dividing said critical time interval into at least two phases, wherein the first characteristic map includes two characteristic set value maps, one set value map for each of said phases and wherein the second characteristic map includes two characteristic correction value maps, one correction value map for each of said phases;

using said two characteristic set value maps to determine selected set values assigned to selected operating points; and using said two characteristic correction value maps to determine selected updated correction values assigned to selected operating points.

3. A process according to claim 1, wherein said step of entering in the second characteristic map said transferred correction value is performed only for a nearest neighboring selected operating point in the second characteristic map in the event said deviation exceeds the threshold value for a non-steady operating state at a non-selected operating point.

4. A process according to claim 1, wherein the step of entering in the second characteristic map said transferred correction value includes entering a transferred correction value which differs from a previous correction value of the neighboring selected operating point essentially by the difference of the non-selected instantaneous correction value ($K_{ZW}$) and the theoretical new correction value ($K_{new(ZW)}$) of the non-selected operating point.

5. An arrangement for adaptive control of a drive component in a motor vehicle having an internal-combustion engine, the drive component having a critical time interval with respect to a controlled variable for a predefined operating behavior of the drive component at selected operating points, the arrangement comprising:

means for detecting (59) an occurrence of a non-steady operating state of the drive component;

memory means (90, 91) for obtaining a selected set value for the critical time interval upon detecting said non-steady operating state for one of the selected operating points, said memory means storing a first characteristic map of set values assigned to the selected operating points of the internal-combustion engine including speed and load information on the selected operating points and a second characteristic map for correction values assigned to the selected operating points of the internal-combustion engine;

means for obtaining (61, 62, 63, 67 and 131) an actual value for the critical time interval upon detecting said non-steady operating state for the one selected operating point;

means for comparing (73) said selected set value with the actual value and determining whether any deviation exceeds a threshold value;

first arithmetic means (99) for calculating a selected updated correction value for controlling the controlled variable with regard to the predefined operating behavior if said deviation exceeds the threshold value;

means for entering (123) said selected updated correction value into said second characteristic map for correction values assigned to the selected operating points of the internal combustion engine;

means of controlling the controlled variable with said selected updated correction value for a subsequent non-steady operating state of the drive component at its assigned selected operating point wherein a new selected updated correction value is entered into said second characteristic map for each occurrence of a subsequent non-steady operating state having a deviation exceeding the threshold value; and said memory means (90, 91) sorting the first and second characteristic maps and including a memory word having n memory cells wherein (n-y) memory cells are used for the entry of the selected updated correction value and wherein y memory cells are used for the entry of the selected set value, said selected updated correction value and said selected set value of the memory word being assigned to the same one selected operating point.

6. An arrangement according to claim 5, wherein n=8 and y-2.

7. An arrangement according to claim 5, wherein a number p of selected operating points is less than about 20.

8. An arrangement according to claim 7, wherein p equals about 9.

9. An arrangement according to claim 5, wherein said means for obtaining an actual value is a measuring means (67), and wherein said means for detecting (59) is connected to inputs of said memory means (90, 91), the arrangement further comprising:

final control element means (33, 84) for controlling the controlled variable;

second arithmetic means (66) for interpolating selected set values received from said memory means (91) for selected operating points neighboring a non-selected operating point to obtain a non-selected set value ($t_{set(ZW)}$) for a non-steady operating state occurring at the non-selected operating point;

third arithmetic means (92) for interpolating selected correction values received from a second memory means (90) for selected operating points neighboring the non-selected operating point to obtain a non-selected instantaneous correction value ($K_{ZW}$) for the non-steady operating state occurring at the non-selected operating point;

second means for comparing (93) said non-selected set value with the actual value and determining whether any deviation exceeds the threshold value;

wherein the second and third arithmetic means each have an input side coupled to the detection means (59) and to the memory means (90, 91);

wherein the second comparator means (73) has an input side which is coupled both to the measuring means (67) and to the second arithmetic means (66) for providing set values assigned to non-selected operating points; and wherein the third arithmetic means (92) for calculating correction values for non-selected operating points has an output side which is coupled at least indirectly to the final control element means (89, 33, 84).

10. An arrangement according to claim 9, further comprising:

fourth arithmetic means (97) for calculating a theoretical new correction value ($K_{new(ZW)}$) for the non-selected operating point when the deviation exceeds the threshold value;

transfer stage means (98) for calculating a transferred correction value ($K_{new(u)}$) from the theoretical new correction value taking into account positional deviation of the non-selected operating point relative to the neighboring selective operating points;

means for entering (32) in the second characteristic map said transferred correction value ($K_{new(u)}$) at one of said neighboring selected operating points;

said fourth arithmetic means (97) having inputs coupled to the second comparison means (93) and the second arithmetic means (66); and said transfer stage means (98) having inputs coupled to the detection means (59) and to the fourth arithmetic means (97) as well as to outputs of said memory means (90) and to said third arithmetic means (92), said transfer stage means (98) further having an output side coupled to an input of said memory means (90).

11. An arrangement according to claim 10, wherein said comparing means (73) has inputs coupled to the measuring means (67) and said memory means (91); and wherein said first arithmetic means (99) has inputs coupled to said comparing means (73) and outputs of said memory means (90, 91) and has an output coupled to the input of said memory means (90).

12. An arrangement according to claim 11, wherein said drive component is a speed-change gear including an automatic shift mechanism having friction elements and a gear transmission, further comprising shift final control elements for actuating the friction elements;

wherein the critical time interval is a shifting time during which the speed-change gear is shifted between a beginning point and an end point; and wherein the control variable is a control pressure, said control pressure controlling the working or shifting pressure for operation of said shift final control elements.

13. An arrangement according to claim 12, wherein said shifting time is determined by registering a change in the gear transmission.

14. An arrangement according to claim 12, further comprising:

means for directly determining an associated shift subtime in at least one phase of the shifting time, and means for registering a change in the gear transmission, thereby determining an associated shift subtime in at least one further phase.

15. An arrangement according to claim 12, further comprising:

means for subdividing the shift time into a total of three phases, and means for registering a change in the gear transmission, thereby determining an associated shift subtime for each phase.

16. An arrangement according to claim 12, further comprising means for measuring a speed of a gear element connected indirectly to a gearbox input shaft for determining a gearbox input speed.

17. An arrangement according to claim 16, wherein the gear element is connected to a gear speed brake.

18. An arrangement according to claim 11, wherein said drive component includes an exhaust catalytic converter of said internal-combustion engine with a first λ probe, positioned ahead of the exhaust catalytic converter and connected to a controller means for optimization of an air-fuel ratio of the internal-combustion engine and with a second λ probe, positioned after the exhaust catalytic converter, the measuring means includes means for measuring a time interval during which the second λ probe indicates an incorrect air-fuel ratio, and both the memory means and the third arithmetic means include outputs which are connected at least indirectly to the controller means.

19. An arrangement according to claim 18, wherein the detection means includes means for responding to a deflection of a flowmeter pressure plate arranged in an intake line system of the internal-combustion engine during a constant speed of the internal-combustion engine.

20. An arrangement according to claim 11, wherein said drive component includes an anti-knock control mechanism means of said internal-combustion engine used to avoid knocking combustion, wherein said comparing means is a combustion comparison means for comparing a reference signal, representing a parameter value for a predetermined combustion, with a combustion indicator signal, indicative of the combustion, and, wherein in cases of unacceptable deviations of the combustion indicator signal control means, control a controlled variable for determining pressure in a combustion chamber to eliminate knocking combustion, the measuring means includes means for measuring a time interval during deviations of the combustion indicator signal, and both the memory means and the third arithmetic stage means are connected at least indirectly to the anti-knock control means.

21. An arrangement according to claim 20, wherein the detection means includes means for responding to deviations of the combustion indicator, directed in the sense of at least one of abnormally high pressure and abnormally high temperature.

22. An arrangement according to claim 21, wherein at least one of an intake pressure and a charging pressure of the internal-combustion engine is used as the controlled variable determining the pressure in the combustion chamber.

* * * * *